(12) United States Patent
Ikeda et al.

(10) Patent No.: US 8,030,434 B2
(45) Date of Patent: Oct. 4, 2011

(54) POLYESTER FILM, PROCESS FOR PRODUCING THE SAME AND USE THEREOF

(75) Inventors: Tsuyoshi Ikeda, Kanagawa (JP); Koshi Koide, Kanagawa (JP); Nobuyuki Koike, Kanagawa (JP); Tadashi Kawabata, Kanagawa (JP); Takeshi Hirokane, Kanagawa (JP); Shojiro Kuwahara, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 1097 days.

(21) Appl. No.: 11/815,361

(22) PCT Filed: Jan. 31, 2006

(86) PCT No.: PCT/JP2006/301503
§ 371 (c)(1),
(2), (4) Date: Aug. 2, 2007

(87) PCT Pub. No.: WO2006/082797
PCT Pub. Date: Aug. 10, 2006

(65) Prior Publication Data
US 2009/0016209 A1    Jan. 15, 2009

(30) Foreign Application Priority Data
Feb. 2, 2005    (JP) .................... 2005-026943

(51) Int. Cl.
*C08G 63/02* (2006.01)
*C08G 63/00* (2006.01)

(52) U.S. Cl. .................. 528/271; 264/176.1; 264/219; 427/145; 427/152; 428/156; 428/170; 428/172; 428/195.1; 430/286.1; 430/480; 528/272

(58) Field of Classification Search .............. 264/176.1, 264/219; 427/145, 152; 428/156, 170, 172, 428/195.1; 430/286.1, 480; 528/271, 272
See application file for complete search history.

(56) References Cited

U.S. PATENT DOCUMENTS
2002/0010309 A1    1/2002    Oguro et al.
2003/0195303 A1    10/2003    Ikeda et al.

FOREIGN PATENT DOCUMENTS
| | | |
|---|---|---|
| EP | 1847561 | * 10/2007 |
| JP | 2002-173539 | 6/2002 |
| JP | 2003-183421 | 7/2003 |
| JP | 2003-183422 | 7/2003 |
| JP | 2003-183423 | 7/2003 |
| JP | 2003-246922 | 9/2003 |
| JP | 2005-343953 | 12/2003 |

OTHER PUBLICATIONS
International Search Report of PCT/JP2006/301503, Mail Date Mar. 28, 2006.

* cited by examiner

*Primary Examiner* — Terressa M Boykin
(74) *Attorney, Agent, or Firm* — Antonelli, Terry, Stout & Kraus, LLP.

(57) ABSTRACT

The present invention relates to a polyester film produced by melt-extruding a polyester composed of a dicarboxylic acid unit and a diol unit, wherein 1 to 80 mol % of the diol unit is a unit containing a cyclic acetal skeleton, and the polyester film has an in-plane retardation of 20 nm or less at a wavelength of 550 nm. The polyester film is an optically isotropic polyester film which is easily produced by an extrusion-molding method and has an economical advantage. The polyester film is useful for production of optical members or optical products such as phase difference films, protective films for polarizing plates, light diffusion films, lens sheets, anti-reflection films and optical information recording media.

29 Claims, 3 Drawing Sheets

Measuring Wavelength λ: 405 nm

POLYESTER FILM, PROCESS FOR PRODUCING THE SAME AND USE THEREOF

TECHNICAL FIELD

The present invention relates to polyester films having a low retardation which are produced from polyesters containing a diol unit having a cyclic acetal skeleton by a melt-extrusion method, and a process for producing the films. The present invention also relates to phase difference films, protective films for polarizing plates, light diffusion films, lens sheets, anti-reflection films and optical information recording media which are produced by using the polyester films.

BACKGROUND ART

[1] Polyesters and Polyester Films

In recent years, there is a rapid increase in demand for flat panel displays such as liquid crystal displays and plasma displays which are used as a display for personal computers, televisions, cellular phones, personal digital assistants, car navigation systems, liquid crystal projectors and clocks.

The flat panel displays are constructed of various optical films such as a polarizing plate, a phase difference film, a prism sheet and an anti-reflection film. Among properties required for these films, a birefringence contributing to an image-forming property is one of important optical properties thereof. In general, the optical films presently used are classified into optically isotropic films having a small birefringence such as protective films for polarizing plates, and optically anisotropic films exhibiting a birefringence to some extent such as phase difference films. The optically anisotropic films are produced by subjecting the optically isotropic films to stretching, etc. From this viewpoint, the optically isotropic films are more important.

As the optically isotropic films, there are known films made of triacetylcellulose, polycarbonates, amorphous cyclic polyolefins, polyether sulfones, polyarylates and polyesters. Almost all of these films are produced by a casting method in which a solution of a resin cast and formed into a film while evaporating the solvent (Patent Documents 1-6). However, the casting method tends to be considerably deteriorated in productivity, and has problems such as adverse influence owing to a residual solvent in the films. Further, the casting method as a production method using a solvent is also undesirable from the standpoint of reducing burdens on environments.

To solve the problems, there have been proposed other film forming methods using a melt-extrusion method. For example, there has been proposed a method of obtaining optically isotropic films by melt-extruding amorphous cyclic polyolefins (Patent Document 7). However, the resultant films is expensive because expensive amorphous cyclic polyolefins are used, and the bonding between the film and another material needs a special adhesive because of a low polarity of the amorphous cyclic polyolefins.

There has been also proposed a method of forming polyether sulfones into a film by a melt-extrusion method (Patent Document 8). However, the obtained films are also expensive because expensive raw resins are used, a smooth surface is difficult to obtain, and the film forming process is complicated.

There has been further proposed a method for obtaining optically isotropic films by reheating a polycarbonate film produced by an extrusion method (Patent Document 9). However, the method is economically disadvantageous because the increased number of steps are required, and the surface of the film is likely to be damaged during the film forming process. Thus, the conventional extrusion-molding methods have failed to produce optically isotropic films in an economically suitable manner.

[2] Phase Difference Films

The phase difference films are produced by stretching an optically isotropic film to allow the film to exhibit a birefringence. The phase difference films are an important member for image display devices such as liquid crystal displays to enhance the contrast and broaden the viewing angle by the optical compensation. Examples of resins generally used for forming the phase difference films include engineering plastic resins such as polycarbonates (PC), triacetylcellulose (TAC) and cycloolefin polymers (COP). The phase difference films are produced by forming these resins into a raw film by a casting method or a melt-extrusion method and then stretching the obtained raw film so as to exhibit a desired retardation.

The raw film having an optional thickness is required to have a small thickness unevenness, a low retardation, a small retardation unevenness and a high ability of generating a retardation even when stretched at a low stretch ratio. By stretching a raw film having these properties, phase difference films having a less unevenness in the thickness and optical properties are obtained.

Also, in recent years, with the entry of foreign competitors into the Japanese market and development of new type displays other than liquid crystal displays such as SED (surface-conduction electron-emitter display), makers of displays have now made severe price-cutting competition for survival. Under these circumstances, the makers of electric and electronic equipments have been forced to reduce the costs of liquid crystal displays, this requiring to bring the costs of various parts down. Therefore, there is a demand for further reducing the costs of phase difference films which are indispensable to liquid crystal displays.

However, in general, the raw PC or TAC films have been conventionally produced only by a casting method requiring high production costs, because a low-cost melt-extrusion method hardly produces films having a low retardation. In addition, COP films produced by the conventionally known melt-extrusion method tend to generate a retardation because of the orientation of polymer chains or stress thereon during the molding (Patent Document 10). Further, since optimum production conditions are unstable, there tends to arise such a problem that a very long period of time is required until reaching a stable production of the raw film sheets satisfying properties as required, resulting in poor yield and high production costs.

In order to prevent the discoloration and the deterioration in contrast of display colors due to a birefringence of STN (super twisted nematic) liquid crystal cell, there has been proposed a method of superimposing an inverse-twisted STN liquid crystal cell thereon (phase compensation of STN liquid crystal cell) (Non-Patent Document 1). Since the liquid crystal has a continuously oriented structure, a birefringence of the liquid crystal must be compensated by using a STN liquid crystal cell also having a continuously oriented structure. Also, in Non-Patent Document 1, a plurality of phase difference films are laminated on the liquid crystal cell in place of the inverse-twisted STN liquid crystal cell, and it is described that the same effect as that of the inverse-twisted STN liquid crystal cell is obtained by laminating 10 phase difference films such that the slow axes thereof are offset from each other. It is also described that although even one phase difference film exhibits the effect to a certain extent, the lamination of two phase difference films is more effective. However, the method of laminating the phase difference films is not described.

In addition, in Non-Patent Document 2, there is disclosed a method of laminating a phase difference film (referred to as an optical compensation film in Non-Patent Document 2) between a polarizing plate and a glass substrate. Since a polarizing plate made of only a polyvinyl alcohol (PVA) stretched film has a poor strength and tends to undergo a considerable change in dimension and shape upon exposure to heat or moisture, a triacetylcellulose (TAC) layer as a protective layer is generally laminated on both surfaces of the polarizing plate (Non-Patent Document 2).

[3] Protective Film for Polarizing Plates

The protective film for polarizing plates is obtained by using an optically isotropic film.

The liquid crystal displays have come to be widely used year by year as a space-saving image displaying device with low power consumption. The conventional liquid crystal displays have such a large disadvantage that images largely depend on a viewing angle. However, in recent years, a wide viewing angle liquid crystal mode such as VA mode and IPS mode has been developed and put into practice, this rapidly increasing the demand of the liquid crystal displays in the applications requiring a wide viewing angle such as televisions. The liquid crystal displays are constituted from liquid crystal cell, orientation film, polarizing plate, phase difference film, viewing angle-expansion film and backlight. The polarizing plate used in the liquid crystal displays is also required to be further improved in quality and productivity.

Typical optical films used in the liquid crystal displays include a protective film for polarizing plates, an orientation film, a phase difference film, a viewing angle-expansion film, etc. The orientation film is directly contacted with liquid crystal and has a function of orienting the liquid crystal relative to a substrate. Examples of a typical material of the orientation film include aromatic polyimides. The phase difference film is used for optical compensation, and serves for preventing the occurrence of viewing angle dependency such as the optical strain due to birefringence and the discoloration of displayed colors due to modulation in a direction of the viewing angle. Examples of a typical material of the phase difference film include polycarbonates and triacetylcellulose (TAC). In addition, in recent years, bulky cyclic olefin resins such as "Zeonor" available from Zeon Corporation and "Arton" available from JSR Corporation have also been used. The viewing angle-expansion film serves for producing a clear image even when viewed from the inclined direction. Examples of a typical material of the viewing angle-expansion film include stretched TAC films and films composed of a film substrate and an oriented discotic liquid crystal applied on its surface.

The polarizing plate is capable of allowing only a light polarized in a specific direction of a random polarized light (non-polarized light) such as natural light to pass therethrough, and is usually constituted from a polarizing film and a protective film. The polarizing film is formed from a polyvinyl alcohol-based stretched film dyed with iodine or a dichromatic dye. The protective film is a transparent resin film provided on one or both surfaces of the polarizing film for the purpose of protecting the polarizing film, and is required to have an optical transparency, a uniform thickness, a low retardation which is expressed by a product of birefringence and thickness, a small retardation unevenness, and a low moisture absorption. If the in-plane retardation is large, the retardation unevenness is high or the thickness unevenness is high, the image quality of liquid crystal displays is considerably deteriorated. Namely, the color irregularity phenomenon in which displayed colors are partially faded and the deflection of images occurs. At present, as the protective film for polarizing plates, there have been most extensively used TAC films having a good transparency, a low birefringence and an adequate rigidity (Non-Patent Document 3).

During the production of these films, the films being produced undergo various stresses due to melt-flowing of resins, drying contraction upon removal of solvents, heat shrinkage, stress upon transportation, etc. Therefore, there tends to occur such a problem that the resultant films have a residual retardation due to birefringence which is attributed to the molecular orientation induced by these stresses. These films have been generally produced by a solution casting method or a melt-extrusion method. The optical films such as the above protective film for polarizing plates are required to exhibit not only good optical properties with an extremely high accuracy, but also a uniform thickness and a good appearance as especially important properties thereof. Therefore, the films have been produced by using the solution casting method. More specifically, the protective film for polarizing plates has been produced by subjecting a concentrated solution of TAC to filtration, casting the filtrate on an endless support such as a roll and a band to form a self-supporting film, and then separating the film from the support, followed by removing the solvent by drying.

However, the solution casting method tends to be deteriorated in productivity and requires high production costs as compared with the melt-extrusion method because the former method needs the solvent removal step. If the time for the removal of the solvent is shortened to avoid these problems, there tend to occur other drawbacks such as the whitening of the films and the increase in retardation thereof and its unevenness, thereby making the production of the protective film for polarizing plates having desired properties difficult. Also, the complete removal of the solvent from the film is difficult. If the residual solvent is prevent in the film, the film undergoes stress unevenly upon stretching, thereby failing to realize a uniform retardation. When such a film is applied to liquid crystal displays such as portable OA devices and displays for automobiles which are used under conditions where temperature changes largely, the film tends to suffer from warpage, resulting in poor image quality. Also, the complete removal of the solvent needs an expensive drying apparatus to increase the facility costs and consumes a large quantity of energy to increase the running costs. Since a large amount of an organic solvent such as methylene chloride is used upon production of the film, there tend to arise additional problems such as adverse influence on heath of workers and environmental pollution due to volatilization of the solvent into atmospheric air.

Under these circumstances, in recent years, it has been attempted to use the melt-extrusion method in place of the solution casting method for producing the optical films. For example, there has been proposed a method for producing an optical polycarbonate film exhibiting a low in-plane retardation (10 nm or lower) in a visible range by the melt-extrusion method (Patent Document 11). However, since the in-plane retardation of the film obtained by the melt-extrusion method is still as high as from 22 to 50 nm, the film produced by this method should be held in a heating apparatus such as an oven and a drying furnace for a predetermined time while applying a tension in the processing direction to reduce the retardation to 10 nm or lower. Thus, since the film having a low in-plane retardation is not produced only by the melt-extrusion method, a low retardation is achieved by the subsequent heat-treatment step.

In addition, the water vapor permeability of the TAC films tends to be too high to use the films as a protective film for polarizing plates. If the protective film for polarizing plates has a high water vapor permeability, the wet heat resistance is reduced, the polarizing performance is reduced due to the dissociation or elimination of iodine in the polarizing film, and the warpage of the polarizing plate may occur. To solve these problems, there have been proposed various techniques for preventing the films from suffering from deterioration in wet heat resistance. However, many of these techniques relate to the methods of reducing a water vapor permeability by adding a hydrophobic additive to TAC or introducing a hydrophobic group into TAC (Patent Documents 12-15). However, TAC films excessively hydrophobilized tend to be hardly bonded to the polarizing film. In addition, some of the additives tend to cause the films to exhibit a birefringence, resulting in a high retardation of the obtained films. Thus, conventionally, it has been quite difficult to obtain the protective film for polarizing plates which satisfies all of a high yield, good optical properties such as a low retardation and a high total light transmittance, a low water vapor permeability and a suitable adhesion to the polarizing film at the same time.

[4] Lens Sheet

The lens sheet is produced by using an optical isotropic film as a substrate.

In recent years, color liquid crystal displays have been extensively used in various application fields such as liquid crystal monitors for portable note-type personal computers and disk top-type personal computers, monitors for liquid crystal televisions and car navigation systems, and monitors for cellular phones. Since the liquid crystal itself is not a self-light emitting element, a device called a backlight is used for lighting the liquid crystal from the back side. The backlight is constituted from a fluorescent tube, a light guide plate, a reflection sheet, a prism sheet, etc. The prism sheet is disposed on the light emitting surface of the light guide plate and serves for improving the optical efficiency of the backlight to enhance the luminance. For example, the prism sheet is obtained by arranging prisms having a triangular sectional shape on a resin film in parallel rows to form an optical element thereon. Further, there may be also used a lens sheet provided with an optical element having Fresnel lenses concentrically arranged on the surface of the resin film (Fresnel lens sheet). In addition, there may be also used a lens sheet provided with an optical element having lenticular lenses formed by arranging a plurality of cylindrical lenses in parallel rows on a surface of the resin film (lenticular lens sheet). The prism sheet, the Fresnel lens sheet and the lenticular lens sheet are generally referred to as lens sheet.

The prism sheet is generally produced by filling a mold having a desired prism pattern with an activation energy radiation-curable resin, superimposing a transparent substrate on the resin and irradiating the resin with an activation energy radiation through the transparent substrate to cure the resin. As the transparent substrate, there may be frequently used a stretched heat-set polyethylene terephthalate film (O-PET) from the standpoints of a good mechanical strength, low costs and a good transparency (Patent Document 16). However, in order to prevent the heat shrinkage due to the irradiation heat upon curing, the amount of radiation energy must be reduced, thereby preventing the improvement of the productivity. In addition, the process for production of the O-PET includes various steps such as melt-extrusion, stretching and heat-setting and, therefore, is complicated (Patent Document 17). Further, in the applications, particularly those exposed to high temperature such as monitors for car navigation systems and cellular phones, the O-PET is required to have a large thickness from the standpoint of a good dimensional stability, thereby preventing the reduction in the thickness. Also, as described in Non-Patent Document 4, since molecular orientation is undesirable for optical films, there is a demand for resin films which are non-oriented (low retardation) and show a good strength without stretching. However, no resin films satisfying these requirements have been presently obtained.

[5] Light Diffusion Film

The light diffusion film is produced by using an optical isotropic film as the substrate.

Conventionally, polyethylene terephthalate stretched films (PET stretched films) have been used as the substrate of the light diffusion films for use in liquid crystal displays because of their excellent mechanical strength, heat resistance and dimensional stability at high temperatures.

In recent years, to improve the contrast of liquid crystal display panels and increase their size, a light source of the backlight is required to emit an increased amount of light. Although the conventional PET films are improved in heat resistance by stretching, the heat resistance is still insufficient, thereby failing to emit an increased amount of light because of the temperature rise during use. To solve the problem, there has been proposed a film for light diffusion plates which is obtained by biaxially stretching a raw film made of polyimide and polyethylene terephthalate to improve the heat resistance (Patent Document 18). However, the stretching requires high costs similarly to the conventional PET stretched films. Further, as described in Non-Patent Document 4, November 4, in order to avoid the undesirable molecular orientation, there is a demand for resin films which are non-oriented (low retardation) and show a good strength without stretching. However, no resin films satisfying these requirements have been presently obtained.

[6] Anti-Reflection Film

The anti-reflection film is produced by using an optical isotropic film as the substrate.

In recent years, there is a rapid increase in demand for flat panel displays such as liquid crystal displays, plasma displays and projection displays which are used as an image display device for personal computers, televisions, cellular phones, personal digital assistants, car navigation systems, liquid crystal projectors and clocks. In these image display devices, in order to suppress deterioration in visibility due to reflection of an external light, the image display devices are provided with an anti-reflection film as an outermost layer.

The anti-reflection film is composed of a substrate mainly made of triacetylcellulose (TAC) or polyethylene terephthalate (PET), a hard coat layer and an anti-reflection layer each being laminated on the substrate.

The TAC substrate is produced by a solution casting method in which a solution is prepared by dissolving TAC having a bonded acetic acid amount (acetylation degree) of 60 to 62% together with a plasticizer in a mixed solvent composed of methylene chloride and methanol, the solution is continuously cast, and then the solvent is evaporated from the cast solution. However, the solution casting method requires a prolonged time and a large amount of energy for the dissolving step and drying step, resulting in high costs and environmental problems (Patent Document 19). Since the TAC film is easily broken during the coating of the anti-reflection layer, a continuous take-up coating method is hardly applicable. Therefore, the coating should be conducted by a single coating manner, resulting in poor productivity (Non-Patent Document 5).

Since the PET unstretched films are poor in the heat resistance, they may heat-shrink when coating the film with an anti-reflection layer by vapor deposition. Therefore, the amount of energy radiation irradiated on the films must be reduced, this being a cause for preventing the improvement of productivity. Further, the process for producing PET films which are enhanced in heat resistance by stretching and heat-setting is complicated because of various steps such as melt-extrusion, stretching and heat-setting (Patent Document 20). In addition, in the application, particularly those exposed to high temperatures such as monitors for car navigation systems and cellular phones, the stretched PET films are required to have a large thickness from the standpoint of a good dimensional stability, thereby inhibiting the reduction of thickness. Also, as described in Non-Patent Document 4, since molecular orientation is undesirable for optical films, there is a demand for resin films which are non-oriented (low retardation) and show a good strength without stretching. However, no resin films satisfying these requirements have been presently obtained.

[7] Optical Information Recording Medium

The optical information recording medium is produced by using an optical isotropic film as the protective layer.

In recent years, development of high-density optical information recording rapidly proceeds. For example, ultra-high density optical disks such as blu-ray discs have now been put into practice. The blu-ray discs having a diameter of 120 mm are capable of recording a large capacity data of 23 GB (giga byte) or more by a single-layer recording, and 47 GB or more by a dual-layer recording. In the blu-ray discs, the high-density recording is realized by reducing the track pitch of grooves on the disks to about 0.32 μm by using an optical system having a recording/reproducing wavelength of about 405 nm and a numerical aperture of about 0.85. With such a large numerical aperture, the distance between a pick-up lens and an information recording/reproducing layer (also merely recording layer) is very small as compared with current DVD disks. Therefore, the protective layer for the recording layer is required to have a thickness as extremely small as 100 μm. In addition, since the information is reproduced by using a polarized laser, the protective layer is required to be optically isotropic. The protective layer is usually constituted from a transparent adhesive layer and an optically isotropic film, and it is strongly required to produce the optically isotropic film at low costs.

In the standard of the blu-ray discs, the thickness of the protective layer formed on a laser incident side of the information recording/reproducing layer is limited to 100 μm (±2 μm). The optical properties required for the protective layer include an in-plane retardation of 5 nm or less at a wavelength of 405 nm. The protective layer is usually mainly made of a film of polycarbonate (PC). However, the PC film has a poor productivity, resulting in high production costs of the disks. Also, it is well known in the art that the PC film produced by melt extrusion hardly shows a reduced retardation. Therefore, the PC film fails to satisfy the properties required as an optically isotropic film for forming the protective layer of the blu-ray discs (Non-Patent Document 6).

The blu-ray films are usually constituted from a substrate having guide grooves, a reflection layer and a recording layer mainly composed of an organic pigment which are sequentially formed on the substrate, and a protective layer formed on the recording layer (Patent Document 21).

Patent Document 1: JP 9-95544A
Patent Document 2: JP 7-256664A
Patent Document 3: JP Patent 3404027
Patent Document 4: JP 7-73876A
Patent Document 5: JP 8-318538A
Patent Document 6: JP 7-41572A
Patent Document 7: JP 2003-279741A
Patent Document 8: JP Patent 3035204
Patent Document 9: JP Patent 2769020
Patent Document 10: JP 2004-109355A
Patent Document 11: JP 2003-302522A
Patent Document 12: JP 2002-22956A
Patent Document 13: JP 2002-146044A
Patent Document 14: JP 2001-343528A
Patent Document 15: JP 9-90101A
Patent Document 16: JP 10-197702A
Patent Document 17: JP 2004-131728A
Patent Document 18: JP 2002-341114A
Patent Document 19: JP 7-11055A
Patent Document 20: JP 2004-131728A
Patent Document 21: JP 2005-186607A
Non-Patent Document 1: Kobayashi, Hirakata and Nagae "Analysis of Phase Plate type Monochrome STN-LCD", Singaku Technical Report, Vol. 88, No. 54, pp. 9 to 16, 1988
Non-Patent Document 2: Satake "Adhesives for Polarizing Plates"; Bonding Technologies, Vol. 25, No. 1, 2005, No. 78, pp. 25 to 30
Non-Patent Document 3: Optical films for Displays" edited by Fumio Ide, CMC Publishing, 2004
Non-Patent Document 4: "Analysis of Demand and Competition for Optical Transparent Plastic Films", Fuji Chimera Research Institute, Inc., Nov. 4, 2004, p. 128
Non-Patent Document 5: "Prospect and Strategy of High-Performance Film Market 2005", published by Yano Research Institute Ltd., pp. 86 to 87
Non-Patent Document 6: Yahata, Kazuo "Features and Mold Processing Techniques of Optical Transparent Resins, and Application to Optical Films/Mold Processing Techniques and Development of Optical Applications of Polycarbonate Films", Technology Information Institute, Mar. 28, 2005, pp. 1 to 36

DISCLOSURE OF THE INVENTION

In view of the above problems, an object of the present invention is to provide an optically isotropic polyester film which is produced by an extrusion and has an economical advantage; a process for producing the polyester film; and optical members using the polyester film such as a phase difference film, a protective film for polarizing plates, a light diffusion sheet, a lens sheet, an anti-reflection film and an optical information recording medium.

As a result of extensive researches, the inventors have found that the polyester containing a specific amount of a cyclic acetal skeleton in the diol unit is easily formed into a film by extrusion; the obtained film has an in-plane retardation which is a specific value or less; an excellent optically isotropic film is produced from the polyester in an economically suitable manner; and the polyester satisfies properties required for optical members such as a phase difference film, a protective film for polarizing plates, a light diffusion sheet, a lens sheet, an anti-reflection film and an optical information recording medium. The present invention has been accomplished on the basis of the above finding.

Thus, the present invention relates to a polyester film produced by melt-extruding a polyester which contains a dicarboxylic acid unit and a diol unit, wherein 1 to 80 mol % of the diol unit is a diol unit containing a cyclic acetal skeleton, and the polyester film has an in-plane retardation of 20 nm or less at a wavelength of 550 nm.

Also, the present invention relates to a process for producing the polyester film and optical members producing by using the polyester film such as phase difference films, protective films for polarizing plates, light diffusion films, lens sheets, anti-reflection films and optical information recording media.

PREFERRED EMBODIMENTS FOR CARRYING OUT THE INVENTION

Figure 1:
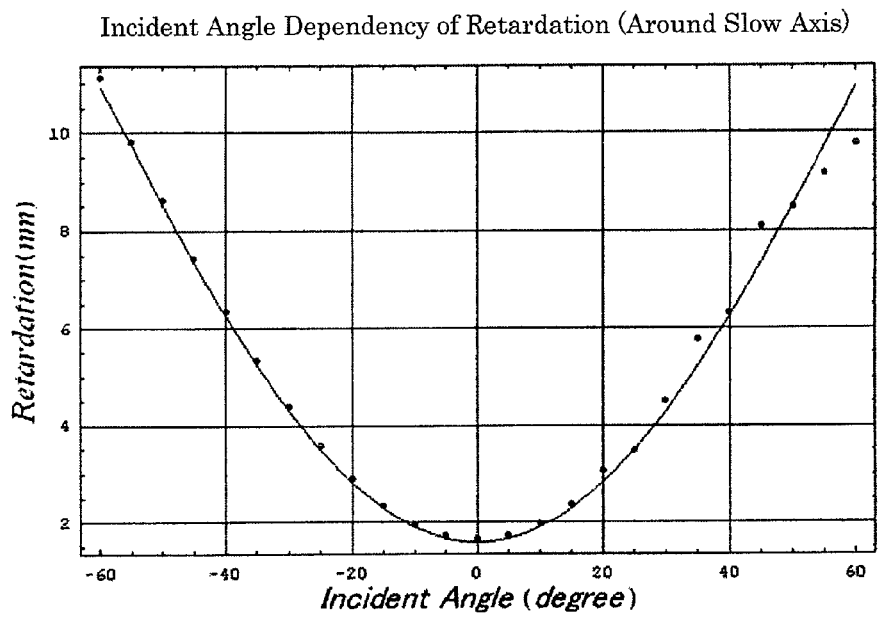
FIG. 1 is a graph showing a measure curve (dotted line) obtained by a spectro-ellipsometer and a theoretical curve (solid line) obtained by using an optical indicatrix.

The present invention is described in detail below.
[1] Polyester
The polyester used in the present invention include a diol unit containing a cyclic acetal skeleton. The cyclic acetal skeleton-containing diol unit is preferably a diol unit derived from a diol represented by the following formula (1):

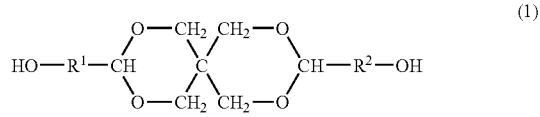

(1)

wherein $R^1$ and $R^2$ is the same or different, and are each independently a hydrocarbon group selected from the group consisting of an aliphatic hydrocarbon group having 1 to 10 carbon atoms, an alicyclic hydrocarbon group having 3 to 10 carbon atoms and an aromatic hydrocarbon group having 6 to 10 carbon atoms, or
a diol represented by the following general formula (2):

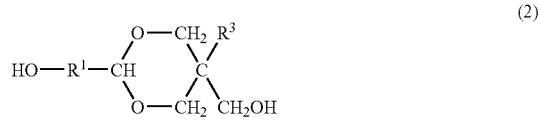

(2)

wherein $R^1$ is the same as defined above; and $R^3$ is a hydrocarbon group selected from the group consisting of an aliphatic hydrocarbon group having 1 to 10 carbon atoms, an alicyclic hydrocarbon group having 3 to 10 carbon atoms and an aromatic hydrocarbon group having 6 to 10 carbon atoms.

Examples of $R^1$ in the formulae (1) and (2) and $R^2$ in the formula (1) include methylene group, ethylene group, propylene group, isopropylene group, butylene group and structural isomers thereof such as isobutylene group, cyclohexylene group and phenylene group. Among these groups, preferred are methylene group, ethylene group, propylene group, butylene group, isopropylene group and isobutylene group.

Examples of $R^3$ in the general formula (2) include methyl group, ethyl group, propyl group, isopropyl group, butyl group and structural isomers thereof such as isobutyl group, cyclohexyl group and phenyl group. Among these groups, preferred are methyl group, ethyl group, propyl group, butyl group, isopropyl group and isobutyl group. The preferred compounds represented by the formulae (1) and (2) are 3,9-bis(1,1-dimethyl-2-hydroxyethyl)-2,4,8,10-tetraoxaspiro[5.5]undecane and 5-methylol-5-ethyl-2-(1,1-dimethyl-2-hydroxyethyl)-1,3-dioxane.

Examples of the diol unit other than the cyclic acetal skeleton-containing diol unit include, but not particularly limited to, units derived from aliphatic diols such as ethylene glycol, trimethylene glycol, 1,4-butanediol, 1,5-pentanediol, 1,6-hexanediol, diethylene glycol, propylene glycol and neopentyl glycol; alicyclic diols such as 1,3-cyclohexane dimethanol, 1,4-cyclohexane dimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornane dimethanol, tricyclodecane dimethanol and pentacyclododecane dimethanol; polyether compounds such as polyethylene glycol, polypropylene glycol and polybutylene glycol; bis(hydroxyaryl)alkanes such as 2,2-bis(4-hydroxyphenyl)propane (bisphenol A), 2,2-bis(3,5-dibromo-4-hydroxyphenyl)propane (tetrabromobisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-tert-butyl-4-hydroxyphenyl)propane, 2,2-bis(3-bromo-4-hydroxyphenyl)propane and 2,2-bis(3,5-dichloro-4-hydroxyphenyl)propane; alkyleneoxide adducts of the above bis(hydroxyaryl)alkanes; bis(hydroxyaryl)cycloalkanes such as 1,1-bis(4-hydroxyphenyl)cyclopentane, 1,1-bis(4-hydroxyphenyl)cyclohexane (bisphenol Z), 1,1-bis(3,5-dibromo-4-hydroxyphenyl)cyclohexane and 1,1-bis(3,5-dichloro-4-hydroxyphenyl)cyclohexane; bis(hydroxyaryl)arylalkanes such as 1,1-bis(4-hydroxyphenyl)-1-phenyl ethane and 1,1-bis(4-hydroxyphenyl)diphenyl methane; dihydroxydiaryl ethers such as 4,4'-dihydroxydiphenyl ether and 4,4'-dihydroxy-3,3'-dimethyl diphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; aromatic dihydroxy compounds such as hydroquinone, resorcin, 4,4'-dihydroxy biphenyl, 4,4'-dihydroxydiphenyl ether and 4,4'-dihydroxydiphenyl benzophenone; and alkyleneoxide adducts of the above aromatic dihydroxy compounds. In view of a good mechanical strength and a good heat resistance of the resultant polyester and an easy availability of the diol, preferred are diol units derived from ethylene glycol, diethylene glycol, trimethylene glycol, 1,4-butanediol and 1,4-cyclohexane dimethanol, and more preferred are diol unit derived from ethylene glycol.

The dicarboxylic acid unit contained in the polyester used in the present invention is not particularly limited. Examples of the dicarboxylic acid unit include those derived from aliphatic dicarboxylic acids such as succinic acid, glutaric acid, adipic acid, pimelic acid, suberic acid, azelaic acid, sebacic acid, decanedicarboxylic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane and 5-carboxy-5-ethyl-2-(1,1-dimethyl-2-carboxyethyl)-1,3-dioxane; and aromatic dicarboxylic acids such as terephthalic acid, isophthalic acid, phthalic acid, 2-methyl terephthalic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, biphenyl dicarboxylic acid and tetralindicarboxylic acid. In view of a good mechanical strength and a good heat resistance of the resultant polyester and a good availability of the dicarboxylic acid, preferred are those derived from terephthalic acid, isophthalic acid and 2,6-naphthalenedicarboxylic acid. Meanwhile, the dicarboxylic acid unit of the polyester may be constituted from only one kind of dicarboxylic acid unit or two or more kinds of dicarboxylic acid units.

The polyester used in the present invention may also contain units derived from monoalcohols such as butyl alcohol, hexyl alcohol and octyl alcohol, units derived from tri- or higher valent polyhydric alcohols such as trimethylol propane, glycerol, 1,3,5-pentanetriol and pentaerythritol, units derived from monocarboxylic acids such as benzoic acid, propionic acid and butyric acid, units derived from tri- or higher valent polycarboxylic acids such as trimellitic acid and pyromellitic acid, units derived from oxy acids such as glycolic acid, lactic acid, hydroxybutyric acid, 2-hydroxyisobutyric acid and hydroxybenzoic acid in order to control a melt viscoelasticity and a molecular weight of the polyester, etc., unless the inclusion of these units adversely affects the objects and effects of the present invention.

In view of a moldability, a heat resistance, mechanical properties, a hydrolysis resistance and an economical advantage, the polyester used in the present invention preferably contains a cyclic acetal skeleton-containing diol unit derived from 3,9-bis(1,1-dimethyl-2-hydroxyethyl)-2,4,8,10-tetraoxaspiro[5.5]undecane, a diol unit other than the cyclic acetal skeleton-containing diol unit which is derived from at least one diol selected from the group consisting of ethylene glycol, diethylene glycol, trimethylene glycol, 1,4-butanediol and 1,4-cyclohexane dimethanol, and a dicarboxylic acid unit derived from at least one dicarboxylic acid selected from the group consisting of terephthalic acid, isophthalic acid and 2,6-naphthalenedicarboxylic acid.

The content of the cyclic acetal skeleton-containing diol unit is preferably from 1 to 80 mol % on the basis of the total diol units. The polyester containing the cyclic acetal skeleton-containing diol unit in an amount of 1 mol % or more satisfies both a reduced crystallinity and an increased glass transition temperature at the same time, thereby enhancing a transparency and a heat resistance of the resultant polyester film. In addition, the polyester film is prevented from suffering from occurrence of whisker upon processing such as cutting and punching and therefore improved in processability, as well as exhibits enhanced optical properties such as a low retardation, a less unevenness of the retardation and a less unevenness of thickness upon the melt extrusion. When the content of the cyclic acetal skeleton-containing diol unit exceeds 80 mol %, the polyester tends to undergo an increased crystallinity, and the polyester film produced therefrom tends to deteriorate in transparency. Therefore, the content of the cyclic acetal skeleton-containing diol unit is from 1 to 80 mol %, preferably from 5 to 60 mol % and more preferably from 15 to 60 mol % on the basis of the total diol units from the standpoints of heat resistance, transparency, processability and optical properties of the resultant polyester film.

The polyester used in the present invention preferably has a glass transition temperature of from 85 to 160° C. and more preferably from 90 to 150° C. When the glass transition temperature of the polyester lies within the above-specified range, the polyester exhibits a good heat resistance during the processing. The glass transition temperature of polyesters may vary depending upon the kinds and contents of the constitutional units. For example, by a polyester containing a cyclic acetal skeleton-containing diol unit derived from 3,9-bis(1,1-dimethyl-2-hydroxyethyl)-2,4,8,10-tetraoxaspiro[5.5]undecane, a diol unit other than the cyclic acetal skeleton-containing diol unit which is derived from ethylene glycol, and a dicarboxylic acid unit derived from terephthalic acid and/or 2,6-naphthalenedicarboxylic acid, a glass transition temperature which lies within the above-specified range is easily attained.

The intrinsic viscosity of the polyester used in the present invention may be appropriately selected according to the forming methods and final use, and is preferably from 0.4 to 1.5 dL/g, more preferably from 0.5 to 1.2 dL/g and still more preferably from 0.6 to 1.0 dL/g as measured at 25° C. in a mixed solvent containing phenol and 1,1,2,2-tetrachloroethane at a mixing ratio of 6:4 by mass. When the intrinsic viscosity of the polyester lies within the above specified range, the polyester is excellent in balance between moldability and mechanical properties.

The melt viscosity of the polyester used in the present invention may also be appropriately selected, and is preferably from 300 to 7000 Pa·s and more preferably from 500 to 5000 Pa·s as measured at 240° C. and a shear rate of 100 s$^{-1}$. The polyester having a melt viscosity which lies within the above-specified range is excellent in balance between moldability and mechanical properties. The melt viscosity of the polyester may vary depending upon not only its intrinsic viscosity but also its constitutional units. As the content of the cyclic acetal skeleton-containing diol unit is increased, the melt viscosity becomes higher.

The melt strength of the polyester used in the present invention may be appropriately selected, and is preferably from 0.5 to 20 cN and more preferably from 1 to 10 cN as measured at a shear rate of 100 s$^{-1}$ and a melt viscosity of 1400 Pa·s. When the melt strength of the polyester lies within the above-specified range, the polyester is stably formed into a film, in particular, by a melt extrusion method.

The process for producing the polyester used in the present invention is not particularly limited. The polyester may be produced by any conventionally known processes. Examples of the process for producing the polyester include a melt polymerization process which is conducted by a transesterification method or a direct esterification method and a solution polymerization process. Upon production of the polyester, there may also be used transesterification catalysts or esterification catalysts, etherification inhibitors, various stabilizers such as heat stabilizers and light stabilizers, polymerization controllers, etc., which are conventionally known in the art. These substances may be appropriately selected in view of reaction rate, color tone of the polyester, safety, heat stability, weather resistance, elution, etc.

The polyester used in the present invention may also contain various additives such as lubricants, antioxidants, light stabilizers, ultraviolet absorbers, plasticizers, extenders, delustering agents, drying controllers, antistatic agents, suspending agents, surfactants, fluidity modifiers, dried oils, waxes, fillers, colorants, reinforcing agents, surface-smoothening agents, leveling agents, curing reaction accelerators and thickening agents, molding assistants, etc. These additives and assistants may be added either at the stage of production of the polyester or at the molding stage.

[2] Polyester Film

The polyester may be formed into a film by a melt extrusion method, a casting method, etc. Among these methods, preferred is a melt extrusion method from the standpoint of a good balance between economy and properties of the resultant film.

The melt extrusion method is described in detail below. The polyester film of the present invention may be produced by known melt extrusion methods. Examples of the melt extrusion methods include a T-die casting method and an inflation-molding method. Among these methods, the T-die casting method is preferred in order to obtain an optically isotropic film. As an apparatus for melting the polyester, there may be used ordinary extruders. The extruders may be of either a single-screw type or a multi-screw type. The extruders may have one or more vents to remove gases, water, low-molecular substances, etc., from the molten resin by evacuating the vents. Further, the extruders may be provided at a tip end or a downstream side thereof with a wire mesh filter or a sintered filter, if desired. Examples of the extrusion die include a T-die, a coat hanger die, a fishtail die and a stuck plate die. In addition, upon producing a multilayer film, there may also be used a feed block method, a multi-manifold method and a combination of the multi-manifold the feed block method.

The extrusion temperature is preferably from 200 to 300° C., more preferably from 210 to 280° C. and still more preferably from 220 to 270° C. When the extrusion temperature lies within the above-specified range, the obtained film is excellent in balance between various properties such as optical isotropy, smoothness, transparency, color tone and mechanical properties. In the melt extrusion method, the air gap (distance between the die for discharging the molten film and the cooling roll) is preferably from 0.1 to 100 mm, more preferably from 1 to 50 mm and still more preferably from 3 to 30 mm. When the air gap lies within the above-specified range, the unevenness of orientation and relaxation due to heat of the resin during the gradual cooling step in the air gap, which is caused by the influence of ambient environment around the air gap or influence of difference in cooling rate between a central portion and an end portion, is small. In addition, a rapid increase in thickness at film end due to neck-in can be prevented.

The molten resin extruded from the die may be cooled by conventionally known methods. In general, the molten resin is cooled by using a cooling roll. The cooling roll may be of either a single roll type or a twin or more roll type in view of the discharge amount of the molten resin and the take-up speed of the resultant film. The method of bringing the molten resin extruded into close contact with the cooling roll is not particularly limited. Examples of the contacting method include an air-knife method, an electrostatic adhesion method and a vacuum method. The molten resin extruded may be cooled by contacting only one surface thereof with the cooling roll or by sandwiching the molten resin between a plurality of cooling rolls such that both surfaces are contacted with the cooling rolls. Since the polyester used in the present invention is substantially amorphous, the cooling roll temperature may be adjusted over a wide range. In order to obtain an optically isotropic film, the cooling roll temperature is preferably controlled to a range of from glass transition temperature of polyester −30° C. to glass transition temperature of polyester +30° C. The take-up speed of the resultant film may vary depending upon output of the molten resin, dimensions of the apparatus such as width of the die, and is preferably from 0.2 to 100 m/min, more preferably from 0.5 to 95 m/min and still more preferably from 1 to 90 m/min. When the take-up speed lies within the above-specified range, the resultant polyester film has an aimed thickness. Upon producing the optically isotropic film, the rotating speeds of the cooling roll, a pinch roll and a take-up roll are preferably controlled such that the film is substantially free from stretching.

The strain generated in the film upon producing the film by a melt extrusion method is attributed to the balance between the molecular orientation due to the residual flow stress (mainly in MD) and the molecular orientation due to the thermal stress (mainly in TD). The residual flow stress is caused by the residual tensile stress remaining in the polymer chains when the polymer chains stretched and oriented by the flow stress return to the entangled state after termination of flowing of the resin to allow the resin to be solidified. The thermal stress is caused by heat shrinkage (thermal strain) of the resin owing to temperature change during the cooling step of the molten resin.

As a result of researches, the inventors have found that the strain of the film is reduced by canceling the orientations such as the molecular orientation caused by shear stress applied to the molten polymer in the T-die (predominately in MD), the molecular orientation in an extruding direction caused by take-up of the film (in MD), the orientation relaxation due to heat of the resin in the step for gradually cooling the molten resin discharged from the T-die in the air gap (mainly the orientation relaxation in MD), and the molecular orientation attributed to the residual stress caused by the constraint of heat shrinkage by the cooling roll, which occurs upon cooling the film on the cooling roll. More specifically, it has been found that the strain is extremely reduced by extruding the resin under the conditions of a temperature of 200 to 300° C., an air gap of 0.1 to 100 mm and a take-up speed of 0.2 to 100 m/min, and controlling the temperature of the cooling roll to the range of from glass transition temperature of polyester −30° C. to glass transition temperature of polyester +30° C.

Next, the polyester film of the present invention is described. In the following, the in-plane retardation Re is defined by the formula: (nx−ny)×d wherein d is a thickness (nm) of the film; nx and ny (nx>ny) are each a main refractive index in the plane of the film. Since the main refractive index varies depending upon a wavelength, the in-plane retardation at a wavelength λ (nm) is expressed by Re[λ]. The in-plane retardation Re[550] of the polyester film of the present invention is preferably 20 nm or less, more preferably 15 nm or less, still more preferably 10 nm or less and still further preferably 5 nm or less (each inclusive of zero). In addition, the value of the formula: (nx−nz)×d at a wavelength of 550 nm wherein nz is a main refractive index in the normal direction of the film plane is preferably 100 nm or less, more preferably 50 nm or less and still more preferably 20 nm or less (each inclusive of zero). Within the above ranges, the polyester film of the present invention is suitably used as an optical film for displays.

The thickness of the polyester film may be optionally selected according to manners of use, applications and required properties, and generally preferably from 1 to 500 μm, more preferably from 5 to 300 μm and still more preferably from 10 to 200 μm. When the thickness of the polyester film lies within the above-specified range, the polyester film of the present invention is excellent in processability, mechanical strength and optical properties.

The thickness variation of the polyester film is preferably from 0.9T to 1.1T, more preferably from 0.93T to 1.07T and still more preferably 0.97T to 1.03T wherein T represents an average thickness of the film. The method for reducing the thickness variation of the polyester film in the extruding direction (MD) is not particularly limited, and there may be widely used a method of providing a vent to an extruder, a method of keeping the amount of the resin being discharged constant by a gear pump disposed between the extruder and die, or a method of stabilizing the driving of the cooling roll by using a servo motor or a planetary gear. The method of reducing the thickness variation of the polyester film in the width direction (TD) perpendicular to the extruding direction is not particularly limited, and there may be used a method of controlling the lip gap of the die by a thermal displacement system, a servo motor system, a pneumatic pressure system, a piezoelectric element system, etc.

If a polyester film having less defects and less fisheyes is needed, the defects and fisheyes in the film can be reduced by removing foreign matters such as gels using a wire mesh filter or a sintered metal filter, although not limited thereto. These filters may be disposed between the extruder and the die and the film is produced while removing the foreign matters. It is also effective to clean the environment for the production of the film or attach a protective film to the film.

The total light transmittance of the polyester film of the present invention is preferably 85% or more and more preferably 90% or more, and the haze of the polyester film is preferably 3% or less and more preferably 2% or less. When these values lie within the above-specified ranges, the polyester film exhibits sufficient properties required for an optical film.

The polyester film of the present invention may be used as a film for various optical members and electronic members either directly or after subjecting the film to various treatments and processings. Examples of the treatments and processings include a coating with a bond, a self adhesive such as a pressure-sensitive adhesive, a mold release agent, an antistatic agent, a diffusing agent or a curable resin, a formation or lamination of a prism or a lens, an etching treatment, a vapor deposition, a sputtering, a stretching and an embossing. Examples of the optical members include a polarizing plate, a lens sheet, an anti-reflection film, an antistatic film, a phase difference film, an optical information recording medium, a λ/4 plate, a λ/2 plate, a touch panel, a viewing angle-compensation film, an anti-glare film, a light diffusion film, a reflection film, a lamp reflector, a plastic film substrate, a transparent conductive film, a protective film and a pellicle.

[3] Phase Difference Film

The phase difference film of the present invention includes a film layer constituted from a film obtained by stretching the above polyester film as a raw film (also referred to as a stretched polyester film or a stretched raw film). By using the polyester film as a raw film, the in-plane retardation and/or the coefficient Nz=(nx−nz)/(nx−ny) wherein nx, ny and nz are the same as defined above) of the obtained film layer are respectively controlled to an optional range. Meanwhile, the coefficient Nz varies depending upon the wavelength. Therefore, the coefficient Nz at a wavelength λ (nm) is expressed by Nz[λ].

The in-plane retardation of the raw polyester film at a wavelength of 550 nm (Re[550]) is preferably 20 nm or less, more preferably 15 nm or less, still more preferably 10 nm or less and still further preferably 5 nm or less. When the in-plane retardation Re[550] lies within the above-specified range, the in-plane retardation and/or the coefficient Nz of the polyester film may be respectively controlled to a desired value by stretching the raw polyester film.

The thickness of the raw polyester film may be optionally selected according to the requirements. The thickness of the film layer is preferably as small as possible in view of reduction in weight of the liquid crystal displays. However, from the limitation of the melt extruder, the thickness of the raw polyester film used for producing the phase difference film is preferably from 20 to 200 μm.

The total light transmittance of the raw polyester film is preferably 85% or more and more preferably 90% or more. The haze of the raw polyester film is preferably 3% or less and more preferably 2% or less. When these values lie within the above-specified ranges, the raw polyester film exhibits properties sufficient for the production of the phase difference film.

Next, the method for stretching the raw polyester film is described in detail. The raw polyester film may be subjected to either monoaxial stretching, sequential biaxial stretching or simultaneous biaxial stretching. Also, as described in JP Patent 2818983, upon stretching, a shrinkable film may be attached onto one or both surfaces of the raw film to form a laminate, and then the laminate may be stretched under heating to apply a shrinking force to the raw film in the direction perpendicular to the stretching direction, thereby obtaining a film layer in which polymer chains oriented in the stretching direction and polymer chains oriented in the thickness direction are combinedly included.

When subjecting the raw polyester film to monoaxial stretching, the resultant film layer has a coefficient Nz[550] of about 1. When subjecting the raw polyester film to sequential biaxial stretching or simultaneous biaxial stretching, the resultant film layer has a coefficient Nz[550] of from 1 to ∞. For example, in the phase difference film suitable for STN mode liquid crystals, there may be used such a film layer produced by the monoaxial stretching which has a coefficient Nz[550] of about 1 and an in-plane retardation Re[550] of from 100 to 500 nm. In the phase difference film suitable for VA (vertical alignment) mode liquid crystals, there may be used such a film layer produced by sequential or simultaneous biaxial stretching which has a coefficient Nz[550] of from more than 1 to ∞ and an in-plane retardation Re[550] of from 0 to 200 nm. In a circular polarizer plate used in reflection/semi-transmission type liquid crystals, or a circular polarizer plate used for shielding a reflection light from an inner ITO glass substrate of a touch panel, a broad band λ/4 plate is required. The broad band circular polarizer plates are produced by laminating a λ/2 plate and a λ/4 plate on a polarizing plate such that the optical axes thereof at a wavelength of 550 nm are inclined relative to each other (JP 10-068816A). The λ/4 plate and λ/2 plate may be produced by subjecting the polyester film to monoaxial stretching.

The stretch ratio is preferably more than 1 but not more than 2, more preferably more than 1 but not more than 1.5 and still more preferably more than 1 but not more than 1.2 in MD and/or TD so as not to cause a bowing phenomenon.

The stretching temperature is in the range of from a glass transition temperature of the polyester to a melting point thereof. The higher stretching temperature enables the resultant stretched film to exhibit a lower retardation at the same stretch ratio. Therefore, it is preferred to control the retardation to a desired value by changing the stretching temperature while maintaining the stretch ratio low so as not to cause the bowing phenomenon. In the simultaneous biaxial stretching, since the stretching temperature cannot be different between the stretching directions, the retardation is controlled to a desired value by stretching at different ratios in the stretching directions.

The phase difference film may have not only a single layer structure composed of only the above film layer, but also a multilayer structure such as a phase difference film formed by laminating two or more film layers on; a phase difference film formed by laminating an optically isotropic protective film on at least one surface of the film layer; a phase difference film formed by integrally laminating a polarizing plate on the film layer; and a phase difference film formed by laminating a release sheet on at least one surface of the film layer through a self adhesive layer or a bond layer.

The phase difference film having a multilayer structure having a laminated film layer is described in detail below. As described above, the film layer having a given retardation is obtained by stretching the raw polyester film. The phase difference film obtained by laminating two or more film layers through a self adhesive or bond having a high transparency is suitably used for phase compensation of STN liquid crystal cells.

Examples of the self adhesive and bond include those containing a base polymer such as polyvinyl alcohol-based polymers, acrylic polymers, silicone-based polymers, polyisocyanates, polyolefins, polyesters, polyethers, vinyl chloride/vinyl acetate copolymers, synthetic rubbers, and modified products obtained by introducing a polar group into these polymers. The self adhesive or bond may also contain known additives such as other polymers, plasticizers, heat stabilizers, ultraviolet absorbers, crosslinking agents and fillers in order to improve the durability, adhesion property, etc. unless the addition thereof adversely affects the effects of the present invention. The self adhesive or bond may be applied on the film layer by conventionally known methods such as those using a coater head. The coating method is not particularly limited as long as the self adhesive and bond are made into a uniform layer. The layer of the self adhesive or bond may be also formed using a commercially available highly transparent adhesive transfer tape having no substrate (tape composed of a layer of the self adhesive or bond and a release film on both surfaces of the layer, such as "Pressure Sensitive Adhesive AD-20" available from Polatechno Co., Ltd., and a substrate-less highly transparent adhesive transfer tape "8141" available from Sumitomo 3M Limited). The thickness of the self adhesive or bond layer is preferably from 5 to 50 µm.

As described above, by stretching the raw polyester film of the present invention, a film layer having a desired retardation can be obtained. The film layers may be laminated together at any angle. At present, there are known liquid crystals having various modes. The phase difference film having a multilayer structure according to the present invention is applicable to not only STN liquid crystal cells but also any of other liquid crystal cells.

Next, the phase difference film formed by laminating an optically isotropic protective layer on at least one surface of the film layer is described in detail. The phase difference of the film layer is exhibited by the orientation of polymer chains of the polyester constituting the film layer. If the film layer suffers from damages such as scratches and marks due to the physical forces externally applied thereto during the transportation or assembling of displays, the retardation tends to change at the damaged portions. In order to prevent such problems, the optically isotropic protective layer (preferably having a thickness of from 5 to 50 µm) is laminated on at least one surface of the film layer. Examples of the optically isotropic protective layer include the raw polyester film used in the present invention and a polycarbonate film, though not limited thereto. The film layer and the optically isotropic protective layer are laminated by applying a self adhesive or bond on the film layer and bonding the optically isotropic protective layer to the self adhesive or bond layer under pressure using a roller. The self adhesive or bond layer may be formed in the same manner as described above.

Next, the phase difference film formed by integrally laminating a polarizing plate on the film layer is described in detail.

A polyvinyl alcohol film is immersed in an aqueous solution containing iodine and potassium iodide and then in an aqueous solution containing boric acid and potassium iodide, and then monoaxially stretched to form a polarizing plate (preferably having a thickness of from 50 to 200 µm). Next, a triacetylcellulose (TAC) sheet (preferably having a thickness of from 40 to 80 µm) is laminated on one surface of the polarizing plate through a self adhesive or bond, and the film layer is laminated on the other surface of the polarizing plate through a self adhesive or bond, thereby uniting the polarizing plate having the TAC sheet with the film layer as the protective layer. The self adhesive or bond layer may be formed in the same manner as described above.

The film layer used as a protective layer for the polarizing plate preferably has a water vapor permeability of from 5 to 500 $g/(m^2 \cdot 24\ h)$, more preferably from 8 to 400 $g/(m^2 \cdot 24\ h)$ and still more preferably from 10 to 300 $g/(m^2 \cdot 24\ h)$ as measured at 40° C. and 90% RH. When the water vapor permeability of the film layer as measured at 40° C. and 90% RH exceeds 500 $g/(m^2 \cdot 24\ h)$, external water tends to pass through the protective film for the polarizing plate and penetrate into the polarizing plate under high-temperature and high-humidity conditions. As a result, the polarizing plate tends to be deteriorated in the polarizing properties or suffers from warpage. In addition, the water included in the polyvinyl alcohol film when immersed in the aqueous solution containing iodine and potassium iodide must be adequately evaporated through the protective layer for the polarizing plate. Therefore, the protective layer for the polarizing plate is required to have an adequate water vapor permeability.

Next, the phase difference film formed by laminating a release sheet on at least one surface of the film layer through a self adhesive or bond is described in detail. The phase difference film obtained by laminating a release sheet (preferably having a thickness of from 10 to 100 µm) on the film layer through a self adhesive or bond is easily bonded to a polarizing plate or a glass substrate after peeling off the release sheet. The self adhesive or bond layer may be formed in the same manner as described above. Examples of the laminated structure of such a phase difference film include film layer/self adhesive or bond layer/release sheet, or polarizing plate/self adhesive or bond layer/film layer/self adhesive or bond layer/release sheet.

[4] Polarizing Plate

The polarizing plate of the present invention includes a film layer constituted from the polyester film (unstretched) and a polarizing film.

The polyester film preferably has a water vapor permeability of from 5 to 500 $g/(m^2 \cdot 24\ h)$, more preferably from 8 to 400 $g/(m^2 \cdot 24\ h)$ and still more preferably from 10 to 300 $g/(m^2 \cdot 24\ h)$ as measured at 40° C. and 90% RH. When the water vapor permeability of the film layer exceeds 500 $g/(m^2 \cdot 24\ h)$, external water tends to pass through the film layer and penetrate into the polarizing film under high-temperature and high-humidity conditions, resulting in deterioration in the properties of the resultant polarizing plate as well as the occurrence of warpage. The polarizing film and the film layer are bonded to each other through an aqueous adhesive in many cases. Therefore, when the water vapor permeability of the polyester film is too low, the time required for drying the aqueous adhesive tends to be increased, resulting in problems such as need of a prolonged time until reaching a proper adhesion strength.

The in-plane retardation of the polyester film at a wavelength of 550 nm (Re[550]) is preferably 20 nm or less, more preferably 15 nm or less, still more preferably 10 nm or less and still further preferably 5 nm or less. When the in-plane retardation exceeds the above-specified range, the resultant liquid crystal displays tend to be deteriorated in image quality, more specifically suffer from defects such as deterioration in contrast, e.g., partially faded colors, and distortion of images.

The thickness of the polyester film may be selected according to requirements, and is preferably from 10 to 200 µm, more preferably from 20 to 100 µm and still more preferably from 30 to 80 µm. When the thickness of the polyester film exceeds the above-specified range, the resultant liquid crystal displays tend to be hardly reduced in thickness and size.

Further, the difference between the maximum thickness and the minimum thickness of the polyester film is preferably 5% or less, more preferably 3% or less and still more preferably 2% or less of the average thickness. When the difference between the maximum and minimum thicknesses of the polyester film exceeds the above-specified range, the resultant liquid crystal displays tend to suffer from defects such as deterioration in image quality and distortion of images.

The total light transmittance of the polyester film is preferably 85% or more and more preferably 90% or more. The haze of the polyester film is preferably 2% or less and more preferably 1% or less. When these values exceed the above-specified ranges, the film tends to be considerably deteriorated in transparency, and the resultant liquid crystal displays tend to become unpractical because of a poor clearness and distinctness of images.

The film layer is laminated on one or both surfaces of the polarizing film through an appropriate self adhesive or bond. The polarizing film is not particularly limited as long as an incident natural light is converted into a linear polarized light. In particular, a polarizing film excellent in light transmittance and polarization degree is preferably used. For example, the polarizing film may be produced by doping iodine or a dichromatic substance such as a dichromatic dye into a film made of polyvinyl alcohol or a partially formalized polyvinyl alcohol, and then stretching the doped film. As the self adhesive or bond, there may be used the same materials as described above, and the self adhesive or bond layer may be formed in the same manner as described above. The self adhesive or bond is preferably an acrylic adhesive and more preferably made of a copolymer of acrylic ester from the standpoints of a good heat resistance and a good transparency.

[5] Lens Sheet

The lens sheet of the present invention includes a film layer made of the polyester film (unstretched) and an optical element formed on at least one surface of the film layer.

The thickness of the polyester film may be selected according to the requirements, and is generally from 50 to 800 µm, and preferably 80 µm or more in view of a good handling property and 300 µm or less in view of reduction in thickness of the backlight unit.

The total light transmittance of the polyester film is preferably 85% or more and more preferably 90% or more, and the haze of the polyester film is preferably 3% or less and more preferably 2% or less. When these values lie within the above-specified ranges, the polyester film exhibits sufficient properties required as a transparent substrate of the lens sheet.

In order to enhance the adhesion to a resin curable by an activated energy radiation or a thermosetting resin for forming the optical element, the surface of the film layer on which the optical element is formed is preferably subjected to an adhesion-improving treatment such as anchor coat treatment.

Figure 3:
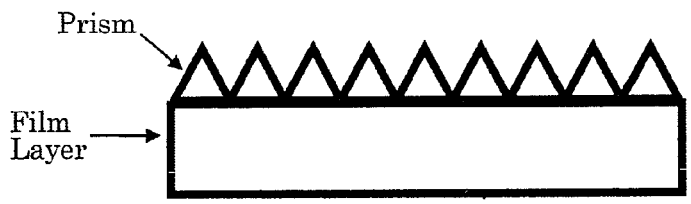
FIG. 3 is a schematic view showing an example of the structure of a prism sheet.

The optical element according to the first preferred embodiment is an array of prisms each having a triangular sectional shape which are arranged in parallel rows on one or both surfaces of the film layer. When plural rows of prisms are formed on both surfaces of the film layer, the rows on one surface are preferably arranged in perpendicular to the rows on the other surface. The apex angle of the prism array may be appropriately selected according to the directionality of light emitted from a light guide member in order to sufficiently enhance the front luminance, and in general is preferably from 50 to 150°. When the prism arrays are disposed so as to face to the light guide member in the backlight of the liquid crystal displays, the apex angle of the prism array is preferably from about 50 to 75° and more preferably from 55 to 70°. When the prism arrays are disposed so as to face to the liquid crystal panel, the apex angle of the prism array is preferably from 80 to 100° and more preferably from 90 to 100°. The pitch of the prism arrays is preferably from 20 to 300 µm and more preferably from 20 to 120 µm. The refractive index of the prism array is preferably 1.45 or more, more preferably 1.50 or more and still more preferably 1.55 or more. The lens sheet having such an optical element is used as a prism sheet (refer to FIG. 3).

The optical element according to a second preferred embodiment is a lenticular lens portion constituted from cylindrical lenses which are arranged in parallel rows. The lens sheet having such an optical element is used as a lenticular lens sheet which is disposed in the liquid crystal displays so as to allow the cylindrical lenses to be arranged in the vertical direction of the liquid crystal displays. With this construction, the light from the backlight is widely scattered in right and left directions of the liquid crystal displays, thereby enabling the viewing angles in the right and left directions of the liquid crystal displays to be well controlled. When the focal distance of the cylindrical lenses is long, the viewing angles in the right and left directions of the liquid crystal displays become small, whereas when the focal distance of the cylindrical lenses is short, the viewing angles in the right and left directions of the liquid crystal displays become enlarged.

The optical element according to a third preferred embodiment is a Fresnel lens portion formed into a concentric Fresnel lens shape. The lens sheet having such an optical element is used as a Fresnel lens sheet to restrict the viewing angle of the displays and enhance the luminance.

The Fresnel lens sheet may be united with the lenticular lens sheet or the prism sheet at their back sides. For example, the lens sheet may be produced by forming different optical elements on both surfaces of the film layer.

The optical element is produced from a resin curable by an activated energy radiation or a thermosetting resin. Also, the optical element may be produced by directly shaping the surface of the film layer. When the optical element is formed from the resin curable by activated energy radiation, the optical element is formed by injecting the resin into a mold having a pattern of optical element, superimposing the film layer on the resin in the mold, and then irradiating an activated energy radiation to the resin through the film layer to cure the resin. The optical element is preferably formed from the resin curable by activated energy radiation in view of a good rubbing resistance, a good handling property and a good productivity.

The resin curable by activated energy radiation is not particularly limited as long as the resin is cured upon exposure to activated energy radiation such as ultraviolet light and electron beam. Such a resin curable by activated energy radiation preferably contains (A) a radical-polymerizable monomer or oligomer and (B) an activated energy radiation sensitive catalyst as main components and may also optionally contain (C) a thermal sensitive catalyst.

The radical-polymerizable monomers or oligomers as the component (A) may be used alone or in combination of two or more, but the combination of two or more is preferred. The component (A) governs the optical properties of the optical element, and may be selectively used according to the properties required for the lens sheet.

As the component (A), there are preferably used, for example, (meth)acrylates such as aliphatic mono(meth)acrylates, alicyclic mono(meth)acrylates, aromatic mono(meth)acrylates, aromatic di(meth)acrylates, alicyclic di(meth)acrylates, aliphatic di(meth)acrylates and polyfunctional (meth)acrylates; and (meth)acrylate-based resins such as epoxy poly(meth)acrylates, urethane poly(meth)acrylates and polyester poly(meth)acrylates in view of good optical properties thereof.

As the activation energy radiation sensitive catalyst as the component (B), there are preferably used compounds which are sensitive to ultraviolet light having a wavelength of from 200 to 400 nm to generate radical sources. Examples of the component (B) include carbonyl compounds such as benzophenone, benzoin isopropyl ether, methylphenyl glyoxylate, 1-hydroxycyclohexyl phenyl ketone and benzyl dimethyl ketal; sulfur compounds; and acyl phosphine oxides such as 2,4,6-trimethylbenzoyldiphenyl phosphine oxide. These compounds as the component (B) may be used alone or in combination of two or more.

The amount of the component (B) used is preferably from 0.005 to 5 parts by weight and more preferably from 0.02 to 2 parts by weight on the basis of 100 parts by weight of the resin curable by activated energy radiation (A). When the amount of the component (B) is less than 0.005 part by weight, the resin tends to be insufficient in curability. When the amount of the component (B) is more than 5 parts by weight, the resin tends to be deteriorated in curability in its deep portion or suffer from discoloration.

Examples of the preferred thermal sensitive catalyst (C) include organic peroxides and azo-based compounds. Specific examples of the organic peroxides include benzoyl peroxide, octanoyl peroxide, diisopropyl peroxypercarbonate, bis(4-t-butylcyclohexyl) peroxydicarbonate, t-butyl peroxyisobutyrate and t-butyl peroxy-2-ethylhexanoate. Specific examples of the azo-based compounds include 2,2'-azobis(2, 4-dimethylvaleronitrile), 2,2'-azobisisobutyronitrile, 2,2'-azobis(4-methoxy-2,4-dimethylvaleronitrile) and 2,2'-azobis(2-methylbutyronitrile). The amount of the component (C) used is preferably from 0 to 5 parts by weight and more preferably from 0.005 to 2 parts by weight on the basis of 100 parts by weight of the resin curable by activated energy radiation (A). When the amount of the component (C) used is more than 5 parts by weight, the resultant optical element tends to be deteriorated in mechanical strength or suffer from discoloration.

The optical element may also contain, if required, various additives such as antioxidants, ultraviolet absorbers, yellowing inhibitors, bluing agents, pigments, diffusing agents and fluorescent brighteners.

As described above, the thus obtained lens sheet of the present invention exhibits a good dimensional stability even at high temperatures. The rate of change in dimension of the lens sheet after allowing the film to stand at 80° C. for 30 min is 0% of the original dimension; the rate of change in dimension of the lens sheet after allowing the film to stand at 100° C. for 30 min is 0% of the original dimension; and the rate of change in dimension of the lens sheet after allowing the film to stand at 120° C. for 30 min is 0% of the original dimension.

[6] Light Diffusion Film

The light diffusion film of the present invention includes a film layer constituted from the polyester film (unstretched) and a light diffusion layer containing diffusion beads and a binder resin.

The thickness of the polyester film may be selected according to the requirements, and is usually from 10 to 150 μm. In view of the particle size of diffusion beads for diffusing a light which ranges from 1 to 50 μm and the thickness of a coating binder which ranges from about 10 to 20 μm, the thickness of the polyester film is preferably from 40 to 100 μm.

The total light transmittance of the polyester film is preferably 85% or more and more preferably 90% or more, and the haze of the polyester film is preferably 2% or less and more preferably 1% or less. When the haze of the polyester film exceeds the above-specified range, the light incident to the polyester film tends to be diffused inside the polyester film, resulting in the reduction in the amount of light emitted therefrom to reduce the light transmittance. Therefore, the haze of the polyester film is preferably as low as possible. The total thickness of the light diffusion film is preferably from 35 to 130 μm and more preferably from 70 to 125 μm. When the total thickness is less than 35 μm, the light diffusion plate produced therefrom tends to be insufficient in tenacity, resulting in poor handling property thereof. When the total thickness is more than 130 μm, the amount of light to be absorbed tends to be increased, resulting in a low light transmittance. Thus, when these values lie within the above optimum ranges, the resultant light diffusion film exhibits sufficient properties.

Next, the structure and the production method of the light diffusion film of the present invention are described.

Figure 4:
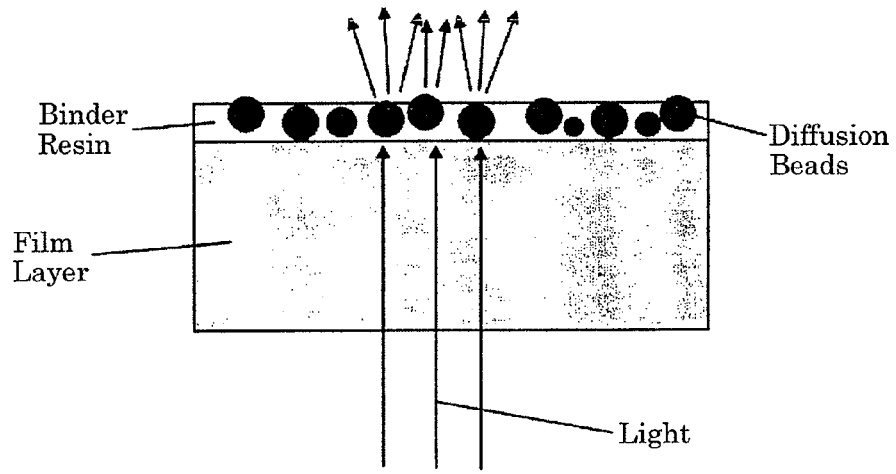
FIG. 4 is a schematic view showing an example of the structure of a light diffusion film.

As shown in FIG. 4, the light diffusion film of the present invention includes a film layer constituted from the polyester film and a light diffusion layer composed of diffusion beads and a binder resin for fixing the diffusion beads. The light diffusion layer has such a structure that the diffusion beads, etc. are dispersed in the binder resin.

As the diffusion beads, there may be used known beads, for example, beads made of at least one material selected from the group consisting of glass, acrylic resins, urethane resins, vinyl chloride resins and polycarbonate resins. The average particle size of the light diffusion beads is preferably from 1 to 50 μm. The content of the light diffusion beads is preferably from 20 to 90% by weight on the basis of the total weight of the light diffusion layer. When the content of the light diffusion beads is less than 20% by weight, the light is not uniformly scattered. When the content of the light diffusion beads is more than 90% by weight, a sufficient adhesion is not obtained.

The light diffusion layer may be formed by applying the binder resin and the diffusion beads on the film layer by a roller coating, a roll coater-coating, a spray coating and an electrostatic coating. The thickness of the light diffusion layer is preferably from 0.5 to 50 μm, more preferably from 1 to 20 μm, still more preferably from 1.5 to 10 μm and still further preferably from 2 to 6 μm.

The binder resin is made of at least one resin selected from the group consisting of ionizing radiation-curable resins, thermosetting resins, electron beam-curable resin and ultraviolet radiation-curable resins. Among these resins, preferred are polymers containing a saturated hydrocarbon chain or a polyether chain as the main chain, and more preferred are polymers containing a saturated hydrocarbon chain as the main chain. Also, the binder resin preferably has a crosslinked structure. The polymers containing a saturated hydrocarbon chain as the main chain are preferably polymers of ethylenically unsaturated monomers. In order to obtain the crosslinked binder resin, a monomer having two or more ethylenically unsaturated groups is preferably used.

Examples of the monomers having two or more ethylenically unsaturated groups include esters of polyhydric alcohol and (meth)acrylic acid such as ethylene glycol di(meth)acrylate, 1,4-dichlorohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,3,5-cyclohexanetriol trimethacrylate, polyurethane polyacrylate and polyester polyacrylate; vinyl benzene derivatives such as 1,4-bivinyl benzene, 2-acryloylethyl 4-vinylbenzoate and 1,4-divinylcyclohexanone; vinyl sulfones such as divinyl sulfone; acrylamides such as methylene bisacrylamide; and methacrylamides. Among these monomers, preferred are penta- or higher functional acrylates such as dipentaerythritol hexaacrylate in view of a good film hardness, i.e., a good scratch resistance. A commercially available mixture of dipentaerythritol pentaacrylate and dipentaerythritol hexaacrylate is particularly preferred.

These monomers having two or more ethylenically unsaturated groups are dissolved in a solvent together with various additives such as a polymerization initiator, applied, dried and then irradiated with an electron beam or heat to allow the monomers to undergo a polymerization reaction for curing.

Further, ethylenically unsaturated monomers having a crosslinkable functional group may be used in place of the monomers having two or more ethylenically unsaturated groups to prepare a binder resin containing the crosslinkable functional group. In addition, there may also be used monomers having a crosslinkable functional group as well as two or more ethylenically unsaturated groups. Examples of the crosslinkable functional group include an isocyanate group, an epoxy group, an aziridine group, an oxazoline group, an aldehyde group, a carbonyl group, a hydrazine group, a carboxyl group, a methylol group and an active methylene group. In addition, the crosslinkable functional group may be a group capable of crosslinking when decomposed, such as a blocked isocyanate group. More specifically, in the present invention, the crosslinkable functional group itself may be non-crosslinkable as long as it is made crosslinkable by the decomposition. The binder resin containing the crosslinkable functional group is applied and then heated to form a crosslinked structure. The ethylenically unsaturated monomer may be mixed with a monomer for introducing a crosslinked structure such as vinylsulfonic acid, acid anhydrides, cyanoacrylate derivatives, melamine, etherified methylol, esters, urethanes, and metal alkoxides such as tetramethoxysilane.

In order to enhance the refractive index of the binder resin itself, a copolymer of a monomer having a high refractive index and/or ultrafine particles of metal oxide having a high refractive index may be added to the binder resin. Examples of the monomer having a high refractive index include bis(4-methacryloylthiophenyl)sulfide, vinylnaphthalene, vinyl phenyl sulfide and 4-methacryloxyphenyl 4'-methoxyphenyl thioether. Examples of the ultrafine particles of metal oxide having a high refractive index include fine particles having a particle size of 100 nm or less and preferably 50 nm or less which is made of an oxide of at least one metal selected from the group consisting of zirconium, titanium, aluminum, indium, zinc, tin and antimony. Examples of the metal oxide include $ZrO_2$, $TiO_2$, $Al_2O_3$, $In_2O_3$, ZnO, $SnO_2$, $Sb_2O_3$ and ITO. Among these metal oxides, especially preferred is $ZrO_2$.

The amount of the ultrafine particles of metal oxide to be added is preferably from 10 to 90% by mass and more preferably from 20 to 80% by mass on the basis of the total mass of the binder resin.

The monomer for the binder resin may be cured by irradiating an electron beam or an ultraviolet light. For example, when curing the binder resin by an electron beam, there may be used an electron beam having an energy of from 50 to 1000 keV and preferably from 100 to 300 keV which is discharged from various electron beam accelerators such as Cockroft-Walton type, van de Graaff type, resonance transformer type, insulating core transformer type, linear type, Dynamitron type and high-frequency type. When curing the binder resin by an ultraviolet light, there may be used an ultraviolet light from various light sources such as an ultrahigh-pressure mercury lamp, a high-pressure mercury lamp, a low-pressure mercury lamp, a carbon arc lamp, a xenon arc lamp and a metal halide lamp.

The light diffusion film of the present invention exhibits a good dimensional stability even under at high temperatures. More specifically, the rate of change in dimension of the light diffusion film after allowing the film to stand at 80° C. for 30 min is 0% of the original dimension; the rate of change in dimension of the light diffusion film after allowing the film to stand at 100° C. for 30 min is 0% of the original dimension; and the rate of change in dimension of the light diffusion film after allowing the film to stand at 120° C. for 30 min is 0% of the original dimension. Therefore, even when replacing the fluorescent tube currently used as the backlight in the liquid crystal displays with LED, the light diffusion film undergoes a less dimensional change even when exposed to generated heat.

At least one surface of the film layer used in the light diffusion film may be subjected to a matting treatment. In addition, the light diffusion film may be produced by melt-extruding the polyester from a T-die after kneading and dispersing acryl beads.

[7] Anti-Reflection Film

The anti-reflection film of the present invention includes a film layer constituted from the polyester film (unstretched) and an anti-reflection layer formed on at least one surface of the film layer.

The in-plane retardation of the polyester film at a wavelength of 550 nm (Re[550]) is preferably 20 nm or less, more preferably 15 nm or less, still more preferably 10 nm or less and still further preferably 5 nm or less. When the in-plane retardation lies within the above-specified range, the resultant anti-reflection film is excellent in visibility of images.

The thickness of the polyester film may be selected according to the requirements, and is generally from 50 to 400 μm, and preferably 80 μm or more in view of a good handling property and 300 μm or less in view of reduction in thickness of the backlight unit.

The total light transmittance of the polyester film is preferably 85% or more and more preferably 90% or more, and the haze of the polyester film is preferably 3% or less and more preferably 2% or less. When these values lie within the above-specified ranges, the resultant anti-reflection film exhibits sufficient properties.

The anti-reflection layer may be produced from known materials by known methods. The anti-reflection layer may be formed on the film layer or a hard coat laminated on the film layer. The anti-reflection layer may have either a single layer structure or a multilayer structure. The anti-reflection layer having a multilayer structure exhibits an extremely low reflectance, and therefore, is suitably used in a backlight-less personal digital assistant.

As a material of the anti-reflection layer, there may be used metal fluorides such as magnesium fluoride, fluorine-containing organic compounds, silica, indium oxide/tin oxide (ITO), etc., though not limited thereto.

The anti-reflection layer may be formed by a dry coating method, for example, a physical vapor deposition method such as vacuum vapor deposition and sputtering and a chemical vapor deposition method such as CVD, or a wet coating method in which a solution is applied and then dried, although not limited thereto. Among these methods, preferred are vacuum vapor deposition and sputtering because the obtained anti-reflection layer exhibits a low reflectance. In the vacuum vapor deposition, a material for the anti-reflection layer is evaporated by a resistance heating method, an electron beam heating method, a high-frequency induction heating method, a laser beam heating method, etc. In general, among these methods, the electron beam heating method is preferably used. The thickness of the anti-reflection layer is preferably from 50 to 150 nm in the case of a single layer structure, and from 100 to 500 in the case of a multilayer structure. When the thickness of the anti-reflection layer lies within the above-specified range, the resultant anti-reflection film exhibits a reflectance of 1% or less.

Figure 5:
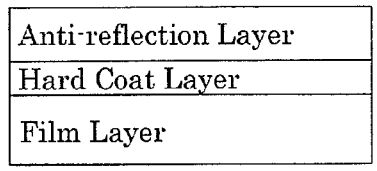
FIG. 5 is a schematic view showing an example of the structure of an anti-reflection film.

A hard coat layer having a thickness of from 1 to 15 μm may be laminated between the film layer and the anti-reflection layer (FIG. 5). The material for the hard coat layer is not particularly limited, and there may be used inorganic oxides such as silica, alumina and polyorganosiloxanes, and transparent, hard resins such as polyfunctional acrylic resins. The hard coat layer may be formed by a dry coating method such as vacuum vapor deposition or a wet coating method such as solution coating. Among these methods, the wet coating method may be preferably used, because the hard coat layer is required to have a thickness of 1 μm or more in many cases in order to exhibit a sufficient hardness (pencil hardness: 2H or more). In the wet coating method, the hard coat layer is preferably formed by irradiating an active radiation to an active radiation-curable rein, for example, an ester of an acrylic compound such as methacrylic acid and a polyfunctional alcohol to crosslink the resin.

[8] Optical Information Recording Medium

The optical information recording medium of the present invention includes a film layer constituted from the above polyester film (unstretched), a transparent adhesive layer, a recording layer, a reflection layer and a substrate which are sequentially laminated in this order.

The in-plane retardation of the polyester film at a wavelength of 405 nm (Re[405]) is preferably 20 nm or less, more preferably 15 nm or less, still more preferably 10 nm or less and still further preferably 5 nm or less. When the in-plane retardation lies within the above-specified range, the polyester film is suitable as a protective film for blu-ray discs, and blu-ray discs capable of stable recording and reproduction can be produced.

The thickness of each layer may be selected according to the requirements. The thickness of the protective layer (transparent adhesive layer and optical film) is preferably from 98 to 102 μm. When the thickness of the protective layer lies within the above-specified range, a tracking servo is operable without problems, thereby preventing occurrence of focusing error. The thickness of the transparent adhesive layer is preferably from 10 to 30 μm, and the thickness of the film layer is preferably from 70 to 90 μm.

The total light transmittance of the polyester film is preferably 85% or more and more preferably 90% or more, and the haze of the polyester film is preferably 3% or less and more preferably 2% or less. When these values lie within the above-specified ranges, the polyester film exhibits sufficient properties required as an optically isotropic film for the protective film of blu-ray discs.

Figure 6:
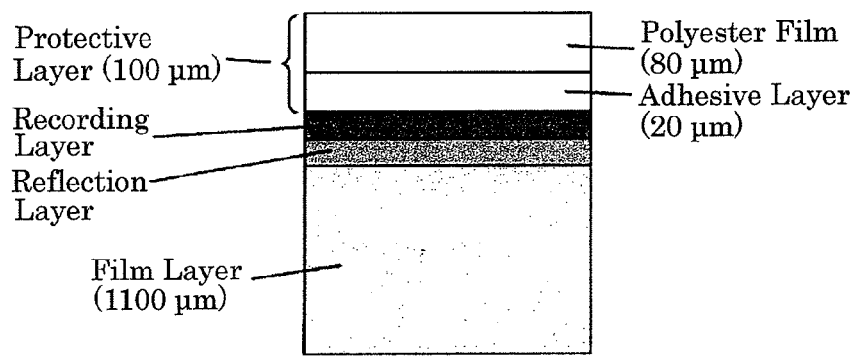
FIG. 6 is a schematic view showing an example of the structure of an optical information recording medium.

An example of the structure of the optical information recording medium according to the present invention is shown in FIG. 6. As shown in FIG. 6, the thickness of the substrate is about 1100 μm. The material for the substrate is not particularly limited as long as guide grooves having a pitch of 0.32 μm are transferred thereon by injection-molding. In general, as the material for the substrate, there may be used inexpensive polycarbonate resins. The reflection layer and the recording layer are successively formed on the substrate by known thin film forming techniques such as an on-plating method and a sputtering method (refer to JP 2005-216365A and JP 2005-158253A). On the thus formed recording layer, the polyester film is laminated through a transparent self adhesive or bond. As the self adhesive or bond, there may be used those described in "[3] Phase Difference Film". Among those self adhesives and bonds, preferred are acrylic transparent self adhesives or bonds, and more preferred are transparent self adhesives or bonds made of acrylic ester copolymers.

Examples

The present invention will be described in more detail with reference to the following examples. However, these examples are only illustrative and not intended to limit the invention thereto.

Various properties of the polyesters used in the following Examples and Comparative Examples were evaluated by the following methods.

(1) Content of Cyclic Acetal Skeleton-Containing Diol Unit

Calculated from the results of $^1$H-NMR measurement. The measurement was conducted at 400 MHz using a measuring apparatus "JNM-AL400" available from JEOL, Ltd. In the measurement, heavy chloroform was used as a solvent.

(2) Glass Transition Temperature

Using "DSC/TA-50WS" available from Shimadzu Corporation, a DSC curve was obtained by heating about 10 mg of a sample in an aluminum unsealed container at a temperature rise rate of 20° C./min under a nitrogen gas flow (30 mL/min). The temperature at the mid-point of the difference between the base lines before and after transition was taken as the glass transition temperature.

(3) Intrinsic Viscosity

After dissolving 0.5 g of the polyester in 120 g of a mixed solvent containing phenol and 1,1,2,2-tetrachloroethane (6:4 by mass) under heating and then subjecting the resultant solution to filtration, the obtained filtrate was cooled to 25° C. to prepare a sample to be measured. The intrinsic viscosity of the sample was measured at 25° C. using an automatic capillary viscometer "SS-300-L1" available from Sibayama Scientific Co., Ltd.

(4) Melt Viscosity

Measured using "Capirograph IC" (tradename) available from Toyo Seiki Seisaku-Sho, Ltd. After preheating for 3 min, the measurement was conducted at 240° C. using a capillary having a diameter of 1 mm and a length of 10 mm under a shear rate of 100 s$^{-1}$.

Various properties of the film obtained in Example and Comparative Examples were evaluated by the following methods.

(5) Thickness

Measured using a digital micrometer "M-30" available from Sony Magnescale, Inc.

(6) Retardation

Using a program for determination of three-dimensional refractive index of a spectrometric ellipsometer "M-220" (tradename) available from JASCO Corporation, the incident angle dependency of retardation around the slow axis was measured. The retardation at an incident angle of 0° was taken as the in-plane retardation Re. Since the in-plane retardation Re varies depending on the measuring wavelength even when measured on the same sample, the in-plane retardation measured at a wavelength $\lambda$ (nm) was expressed by Re[$\lambda$].

(7) Total Light Transmittance and Haze

Measured according to JIS K-7105 and ASTM D1003. After moisture conditioning for 48 h, the total light transmittance and haze were measured at 23° C. and a relative humidity of 50% using a haze meter "Model: COH-300A" available from Nippon Denshoku Industries Co., Ltd.

(8) Water Vapor Permeability

Measured at 40° C. and 90% RH according to JIS K-7129 using "L80-4005L" available from Lyssy AG Zllikon.

(9) Rate of Change in Dimension

Measured according to JIS K-7133. Three lines were drawn on the film at intervals of 50 mm in each of the length and width directions. After storing the film for 30 min in a hot air dryer at a predetermined temperature, the rate of change in dimension was calculated according to the following formula:

Rate of Change in Dimension(%)={$(La-Lb)/La$}×100 wherein La represents a distance (50 mm) between the lines before storing and Lb represents a distance between the lines after storing.

Meanwhile, in the following Tables, the extruding direction is represented by "MD" and the direction perpendicular to the extruding direction is represented by "TD".

Production Examples 1-4

Production of Polyester

A 150-L polyester production apparatus equipped with a packing fractionating tower, a partial condenser, a total condenser, a cold trap, an agitator, a heater and a nitrogen inlet tube was charged with raw monomers shown in Table 1. The raw monomers were heated to 215° C. under a nitrogen atmosphere in the presence of manganese acetate tetrahydrate in an amount of 0.03 mol % on the basis of a dicarboxylic acid component, to subject the monomers to a transesterification reaction. After the conversion of the dicarboxylic acid component reached 90% or more, antimony (III) oxide and trimethyl phosphate were added to the reaction mixture in amounts of 0.02 mol % and 0.06 mol %, respectively, on the basis of the dicarboxylic acid component. The mixture was gradually heated while reducing the pressure and finally subjected to a polycondensation reaction at 270° C. under 0.1 kPa. At the time at which the melt viscosity of the reactant reached an adequate value, the reaction was terminated, thereby producing a polyester. The evaluation results are shown in Table 1.

The resins used in Comparative Examples are shown below.

(1) Polyethylene terephthalate: "RT543C" available from Japan Unipet Co., Ltd. (referred to as "PET" in Tables)

(2) Polycarbonate: "Iupilon E-2000" available from Mitsubishi Engineering-Plastics Corporation (referred to as "PC" in Tables)

Examples 1-4

Production of Polyester Film

Using a film forming apparatus constituted from a vacuum-vented single-screw extruder (screw diameter: 32 mmφ) fitted with a leaf disk-type polymer filter (mesh size: 5 μm; diameter: 4 in; 8 sheets) and a 300 mm-width coat hanger T-die, a cooling roll (capable of controlling the temperature by a heating medium), a take-up roll and a winding machine (capable of controlling the tension), the polyesters obtained in Production Examples 1 to 4 were respectively extruded into films having a thickness of about 100 μm under the following conditions: an extruder cylinder temperature of 250° C., a polymer filter temperature of 250° C., a T-die temperature of 250° C., a cooling roll temperature of 81 to 88° C., a T-die lip opening of 0.7 mm, an air gap of 20 mm, a discharge rate of 9 kg/h, a screw rotation of 55 rpm and a take-up speed of 4 m/min. The evaluation results are shown in Table 2.

Comparative Example 1

Production of Polyester Film

The polyethylene terephthalate was melt-extruded in the same manner as in Example 1 except that the cooling roll temperature was changed to 70° C. (glass transition temperature of resin −34° C.), thereby obtaining a film having a thickness of about 100 μm. The adhesion between the film and the roll during the production was poor, and the film suffered from partial swelling and poor appearance. The evaluation results are shown in Table 3.

Comparative Example 2

Production of Polyester Film

The polyethylene terephthalate was melt-extruded in the same manner as in Example 1 except that the cooling roll temperature was changed to 137° C. (glass transition temperature of resin +33° C.), thereby obtaining a film having a thickness of about 100 μm. The adhesion between the film and the roll during the production was too strong, and the film suffered from peel marks due to repeated actions of excessive adhesion and peeling. The evaluation results are shown in Table 3.

Comparative Example 3

Production of Polyethylene Terephthalate Film

The polyethylene terephthalate was melt-extruded at a cylinder temperature of 220 to 275° C. and at a die temperature of 265° C. The extruded molten resin was cooled on a cooling roll maintained at 70° C., thereby obtaining a film having a thickness of about 100 μm. The evaluation results are shown in Table 3.

Comparative Example 4

Production of Polycarbonate Film

The polycarbonate was melt-extruded in the same manner as in Example 1 except for changing the cylinder temperature to 220 to 260° C. and the die temperature to 255° C. The extruded molten resin was cooled on a cooling roll maintained at 130° C., thereby obtaining a film having a thickness of about 100 μm. The evaluation results are shown in Table 3.

Examples 5-7

Production of Polyester Film

Using a film forming apparatus constituted from a vacuum-vented single-screw extruder (screw diameter: 50 mmφ) fitted with a gear pump and a 550 mm-width coat hanger T-die, a cooling roll (capable of controlling the temperature by a heating medium), a take-up roll and a winding machine (capable of controlling the tension), the polyester obtained in Production Example 1 was melt-extruded films having a thickness of about 100 μm under the following conditions: an extruder cylinder temperature of 240° C., a polymer filter temperature of 240° C., a gear pump temperature of 240° C., a T-die temperature of 240° C., a cooling roll temperature of 80 to 92° C., a T-die lip opening of 0.5 mm, an air gap of 15 mm, a discharge rate of 30 kg/h, a screw rotation of 55 rpm and a take-up speed of 12 m/min, thereby producing films each having a thickness of about 100 μm. The evaluation results are shown in Table 4.

Examples 8-9

Production of Polyester Film

The polyester obtained in Production Example 1 was melt-extruded into films having thicknesses of 38 μm and 120 μm in the same manner as in Example 5 except that the cooling roll temperature was fixed at 80° C. and the take-up speed was changed to 30 m/min or 10 m/min, thereby obtaining films having thicknesses of 38 μm and 120 μm, respectively. The evaluation results are shown in Table 4.

TABLE 1

|  | Production Examples | | | |
|---|---|---|---|---|
|  | 1 | 2 | 3 | 4 |
| Charged amount (mol) | | | | |
| Dicarboxylic acid component (mol) | | | | |
| DMT | 201.8 | 174.6 | 275.9 | 208.0 |
| NDCM | 0.0 | 0.0 | 14.5 | 0.0 |
| Diol component (mol) | | | | |
| SPG | 62.6 | 80.3 | 17.6 | 0.0 |
| EG | 341.1 | 356.2 | 508.4 | 330.7 |
| DOG | 0.0 | 0.0 | 0.0 | 43.7 |
| Evaluation of polyester | | | | |
| Content of cyclic acetal skeleton-containing diol unit (mol %) | 31 | 46 | 5 | 19 |
| Glass transition temperature (° C.) | 104 | 113 | 90 | 89 |
| Intrinsic viscosity (dL/g) | 0.70 | 0.66 | 0.67 | 0.73 |
| Melt viscosity (Pa · s) | 2150 | 2950 | 1860 | 2100 |

Note
DMT: Dimethyl terephthalate
NDCM: Dimethyl 2,6-naphthalenedicarboxylate
EG: Ethylene glycol
SPG: 3,9-Bis(1,1-dimethyl-2-hydroxyethyl)-2,4,8,10-tetraoxaspiro[5.5]undecane
DOG: 5-Methylol-5-ethyl-2-(1,1-dimethyl-2-hydroxyethyl)-1,3-dioxane

TABLE 2

|  | Examples | | | |
|---|---|---|---|---|
|  | 1 | 2 | 3 | 4 |
| Resin (Production Example) | 1 | 2 | 3 | 4 |
| Glass transition temperature (° C.) | 104 | 113 | 90 | 89 |
| Cooling roll temperature (° C.) | 81 | 88 | 80 | 85 |
| Evaluation of film | | | | |
| Thickness (μm) | 98 | 101 | 103 | 105 |
| In-plane retardation Re[550] (nm) | 12 | 10 | 18 | 14 |
| Total light transmittance (%) | 92 | 92 | 91 | 92 |
| Haze (%) | 0.4 | 0.5 | 0.4 | 0.5 |

TABLE 3

|  | Comparative Examples | | | |
|---|---|---|---|---|
|  | 1 | 2 | 3 | 4 |
| Resin (Production Example) | 1 | 1 | PET | PC |
| Glass transition temperature (° C.) | 104 | 104 | 80 | 145 |
| Cooling roll temperature (° C.) | 70 | 137 | 70 | 130 |
| Evaluation of film | | | | |
| Thickness (μm) | 97 | 103 | 109 | 103 |
| In-plane retardation Re[550] (nm) | 32 | 45 | 23 | 28 |
| Total light transmittance (%) | 91 | 92 | 92 | 90 |
| Haze (%) | 0.4 | 0.4 | 1.3 | 0.4 |

TABLE 4

|  | Examples | | | | |
|---|---|---|---|---|---|
|  | 5 | 6 | 7 | 8 | 9 |
| Resin (Production Example) | 1 | 1 | 1 | 1 | 1 |
| Glass transition temperature (° C.) | 104 | 104 | 104 | 104 | 104 |
| Cooling roll temperature (° C.) | 80 | 90 | 92 | 80 | 80 |
| Evaluation of film | | | | | |
| Thickness (μm) | 12 | 12 | 12 | 30 | 10 |
| In-plane retardation Re[550] (nm) | 99 | 101 | 102 | 38 | 120 |
| Total light transmittance (%) | 10 | 1 | 4 | 19 | 4 |
| Haze (%) | 92 | 92 | 92 | 92 | 92 |
| Haze (%) | 0.4 | 0.4 | 0.4 | 0.3 | 0.4 |

In the following, the phase difference film constituted from the polyester fin of the present invention is described in detail.
Method for Evaluation of Phase Difference Film
(1) Calculation of Coefficient Nz and Retardation Rth in Thickness Direction ([(nx+ny)/2−nz]×d Wherein d Represent a Thickness of the Film)

Using a spectrometric ellipsometer, the incident angle dependency of the retardation around the slow axis in a plane of the film was measured. From the results of the measurement as well as the thickness of stretched film and the average refractive index of the resin, the main axis length of the optical indicatrix of the stretched film, i.e., main refractive indices nx, ny and nz were calculated. The calculation was made by fitting between measured values and the characteristic curve based on the analytical solution of the incident angle dependency of retardation using an optical indicatrix model in an optical film as described in "Technology of the GRP Formula for Wide-Viewing-Angle LCDs", Sharp Technical Journal, No. 85 (April, 2004). From the calculated main refractive indices nx, ny and nz and the thickness d of the film, the coefficient Nz and the retardation Rth in the thickness direction were determined according to the above formula. Since Nz and Rth vary depending on the measuring wavelength, the coefficient Nz and the retardation in the thickness direction as measured at a wavelength λ (nm) are expressed by Nz[λ] and Rth[λ].

In FIG. 1, there are shown measured values (dotted line) of incident angle dependency of retardation around the slow axis of the raw polyester film at a wavelength of 550 nm which were measured by a spectrometric ellipsometer, and a theoretical curve (solid line) prepared by using the above model.

Production Example 5

Production of Raw Polyester Film

Using a single-screw extruder (screw diameter: 50 mmφ) provided with a vacuum vent and a 550 mm-wide coat hanger die, the polyester obtained in Production Example 1 was melt-extruded at a cylinder temperature of 220 to 240° C., a die temperature of 240° C. and a discharge rate of 30 kg/h. The extruded molten resin was cooled on a first roll maintained at 96° C. and then a second roll maintained at 60° C., and then taken up at a rate of 12 m/min, thereby producing a raw polyester film having a thickness of 80 μm and a width of 480 mm. The evaluation results are shown in Table 5 and FIG. 1.

Example 10

Production of Phase Difference Film (Stretched Film)

Using a stretching machine, the raw polyester film was monoaxially stretched at a stretch ratio of 1.5 times, a stretching speed of 30 mm/min, and a stretching temperature of the glass transition temperature of the polyester obtained in Production Example 1+7.57° C., thereby producing a phase difference film 1. The evaluation results are shown in Table 6. Meanwhile, the coefficient Nz[550], the in-plane retardation Re[550] and the retardation Rth[550] in the thickness direction were calculated in the same manner as those of the raw polyester film.

Example 11

Production of Phase Difference Film (Stretched Film)

The same procedure as in Example 10 was repeated except that the stretching temperature was changed to the glass transition temperature +17.57° C., thereby producing a phase difference film 2. The evaluation results are shown in Table 6.

Example 12

Production of Phase Difference Film (Stretched Film)

The same procedure as in Example 10 was repeated except that the stretching temperature was changed to the glass transition temperature +27.57° C., thereby producing a phase difference film 2. The evaluation results are shown in Table 6.

Figure 2:
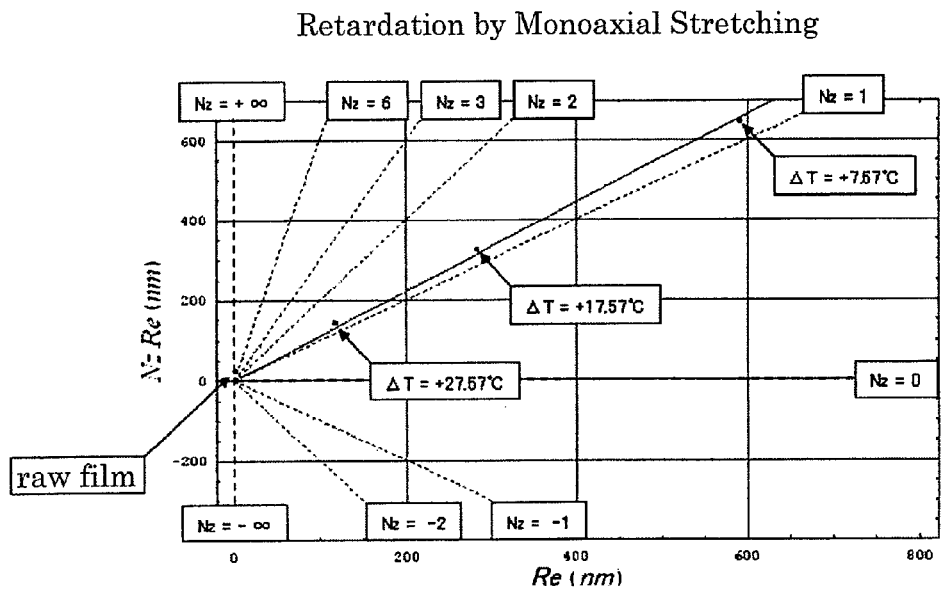
FIG. 2 is a graph showing an occurrence of retardation by monoaxial stretching.

In FIG. 2, there are shown positions of optical indicatrix on the plane which are defined by Re[550]×Nz[550] and Re[550] of the raw polyester film and the stretched films obtained in Examples 10 to 12. As seen from FIG. 2, the monoaxially stretched film had a coefficient Nz[550] of about 1, and the in-plane retardation Re[550] was increased as the stretching temperature was lowered.

Example 13

Multilayer Phase Difference Film

Two pieces of the phase difference films 2 were superimposed on each other through an acrylic adhesive "DP-8005 Clear" available from Sumitomo 3M Limited such that the slow axes were inclined by 120°, and then pressed together using a roller, thereby producing a phase difference film having a multilayer structure.

Example 14

Phase Difference Film/Protective Film

The multilayer phase difference film obtained in Example 13 was laminated on the 80 μm-thick raw polyester film as a protective layer, which was produced in the same manner as in Production Example 5, through an acrylic adhesive "DP-8005 Clear" available from Sumitomo 3M Limited, thereby producing a phase difference film having an optically isotropic protective layer.

Example 15

Phase Difference Film/Polarizing Film

A 75 μm-thick polyvinyl alcohol film "Kuraray Vinylon #7500" available from Kuraray Co., Ltd. was fitted to a chuck and immersed in an aqueous solution containing 0.2 g/L of iodine and 60 g/L of potassium iodide at 30° C. for 240 s. Next, the film was immersed in an aqueous solution containing 70 g/L of boric acid and 30 g/L of potassium iodide at 30° C. to subject the film to a boric acid treatment for 5 min while monoaxially stretching the film at a stretch ratio of 6.0 times. Finally, the film was dried at room temperature for 24 h, thereby obtaining a polarizing film. On one surface of the polarizing film, a 40 μm-thick triacetylcellulose (TAC) sheet was laminated through an acrylic adhesive "DP-8005 Clear" available from Sumitomo 3M Limited by using a roller. On the other surface of the polarizing film, the phase difference film 1 was integrally laminated through the same acrylic adhesive by using a roller such that the light absorption axis of the polarizing film was offset against the slow axis of the phase difference film.

Example 16

The same procedure as in Example 15 was repeated except that the raw polyester film obtained in Production Example 5 was used in place of the 40 μm-thick triacetylcellulose (TAC) sheet, thereby producing a phase difference film a united polarizing film. Since the protective layer and the phase difference film laminated on both surface of the polarizing film were constituted from the same polyester (polyester obtained in Production Example 1), the resultant laminate exhibited a good effect of preventing warpage due to moisture absorption.

Example 17

Phase Difference Film/Self Adhesive or Bond Layer/Release Sheet

On the surface of the phase difference film obtained in Example 14 which was opposite to the protective layer, a 25 μm-thick acrylic high-transparency adhesive layer (substrateless high-transparency adhesive transfer tape "8141" available from Sumitomo 3M Limited was laminated by using a roller.

TABLE 5

| Resin (Production Example) | 1 |
|---|---|
| Evaluation of raw film | |
| Thickness (μm) | 80 |
| Nz[550] | 14.97 |
| In-plane retardation Re[550] (nm) | 1.6 |
| Retardation in thickness direction Rth[550] (nm) | 23.16 |
| Water vapor permeability (g/m²/24 h) | 88 |
| Total light transmittance (%) | 92 |
| Haze (%) | 0.4 |

TABLE 6

| | Examples | | |
|---|---|---|---|
| | 10 | 11 | 12 |
| Raw film (Production Example) | 5 | 5 | 5 |
| Evaluation of stretched film | | | |
| Stretching temperature ΔT (° C.)* | +7.57 | +17.57 | +27.57 |
| Stretch ratio (times) | 1.5 | 1.5 | 1.5 |
| Stretching speed (mm/min) | 30 | 30 | 30 |
| Thickness (μm) | 50 | 50 | 50 |
| Nz[550] | 1.09 | 1.14 | 1.20 |
| In-plane retardation Re[550] (nm) | 590.7 | 284.1 | 118.2 |
| Retardation in thickness direction Rth[550] (nm) | 351.4 | 182.0 | 83.2 |

Note
*Difference from the glass transition temperature

In the following, the protective film for polarizing plates which was constituted from the polyester film of the present invention is described in detail.

Method for Evaluation of Polarizing Plate
(1) Light Leakage Test

Two pieces of polarizing plates each cut into a size of 10 cm×10 cm were allowed to stand at 80° C. and a relative humidity of 90% for 100 h to prepare test specimens. The test specimens were mounted on a cross-nicol and place in a light box maintained at a color temperature of 5000 K, to visually observe the occurrence of light leakage.

Example 18

Production of Polyester Film

Using a single-screw extruder (screw diameter: 50 mmϕ) provided with a vacuum vent and a 550 mm-wide coat hanger die, the polyester obtained in Production Example 1 was melt-extruded at a cylinder temperature of 240° C., a die temperature of 240° C. and a discharge rate of 30 kg/h. The extruded molten resin was cooled on a first roll maintained at 96° C. and then a second roll maintained at 60° C., and then taken up at a rate of 12 m/min, thereby producing a raw polyester film having a thickness of 76 μm and a width of 480 mm. The evaluation results are shown in Table 7.

Production of Polarizing Plate

A 75 μm-thick polyvinyl alcohol film "Kuraray Vinylon #7500" available from Kuraray Co., Ltd. was fitted to a chuck and immersed in an aqueous solution containing 0.2 g/L of iodine and 60 g/L of potassium iodide at 30° C. for 240 s. Next, the film was immersed in an aqueous solution containing 70 g/L of boric acid and 30 g/L of potassium iodide at 30° C. to subject the film to a boric acid treatment for 5 min while monoaxially stretching the film at a stretch ratio of 6.0 times. Finally, the film was dried at room temperature for 24 h, thereby obtaining a polarizing film. The polarizing film and the polyester film obtained above were laminated on each other through an acrylic adhesive "DP-8005 Clear" available from Sumitomo 3M Limited, thereby producing a polarizing plate. The result of light leakage test is shown in Table 7.

Example 19

Production of Polyester Film

A raw polyester film was produced in the same manner as in Example 18 except that the discharge rate was changed to 55 kg/h, and the cylinder temperature and die temperature both were changed to 250° C. The resultant raw polyester film had a thickness of 152 μm and a width of 497 mm. The evaluation results are shown in Table 7.

Production of Polarizing Plate

A polarizing plate was produced in the same manner as in Example 18 except for using the above raw polyester film. The result of light leakage test is shown in Table 7.

Example 20

Production of Polyester Film

A raw polyester film was produced in the same manner as in Example 18 except that the first roll temperature was changed to 94° C. The resultant raw polyester film had a thickness of 74 μm and a width of 479 mm. The evaluation results are shown in Table 7.

Production of Polarizing Plate

A polarizing plate was produced in the same manner as in Example 18 except for using the above raw polyester film. The result of light leakage test is shown in Table 7.

Example 21

Production of Polyester Film

A raw polyester film was produced in the same manner as in Example 18 except that the temperatures of cylinder and die of the extruder were changed to 245° C. The resultant raw polyester film had a thickness of 74 μm and a width of 482 mm. The evaluation results are shown in Table 7.

Production of Polarizing Plate

The polarizing plate was produced in the same manner as in Example 18 except for using the above raw polyester film. The result of light leakage test is shown in Table 7.

Comparative Example 5

Production of PC Film

The melt-extrusion procedure was conducted in the same manner as in Example 18 except that a polycarbonate "Iupilon E-2000R" (tradename) available from Mitsubishi Engineering-Plastics Corporation (referred to as "PC" in Tables)

was used in place of the polyester, the cylinder temperature and the die temperature were changed to 290° C., and the first roll temperature was changed to 130° C. The resultant film had a thickness of 75 μm and a width of 476 mm. The evaluation results are shown in Table 8.

Production of Polarizing Plate

The polarizing plate was produced in the same manner as in Example 18 except for using the above PC film. The result of light leakage test is shown in Table 8.

Comparative Example 6

Production of PET Film

The melt-extrusion procedure was conducted in the same manner as in Example 18 except that a polyethylene terephthalate "RT543C" (referred to as "PET" in Tables) available from Japan Unipet Co., Ltd. was used in place of the polyester, the cylinder temperature and the die temperature were changed to 270° C., and the first roll temperature was changed to 70° C. The resultant film had a thickness of 75 μm and a width of 476 mm. The evaluation results are shown in Table 8.

Production of Polarizing Plate

The polarizing plate was produced in the same manner as in Example 18 except for using the above PET film. The result of light leakage test is shown in Table 8.

Comparative Example 7

TAC Cast Film

A triacetylcellulose film "Fujitac Clear" (tradename) available from Fuji Photo Film Co., Ltd. (referred to as "TAC" in Tables) was directly used. The evaluation results are shown in Table 8.

Production of Polarizing Plate

The polarizing plate was produced in the same manner as in Example 18 except for using the above TAC film. The result of light leakage test is shown in Table 8.

TABLE 7

| | Examples | | | |
|---|---|---|---|---|
| | 18 | 19 | 20 | 21 |
| Resin (Production Example) | 1 | 1 | 1 | 1 |
| Production method | melt extrusion | melt extrusion | melt extrusion | melt extrusion |
| Evaluation results of film | | | | |
| Thickness (μm) | 76 | 152 | 74 | 74 |
| Unevenness of thickness (μm) | ±1.3 | ±1.6 | ±1.4 | ±1.4 |
| Unevenness of thickness (%) | ±1.7 | ±1.1 | ±1.9 | ±1.9 |
| In-plane retardation Re[550] (nm) | 1.9 | 2.9 | 3.7 | 4.6 |
| Total light transmittance (%) | 92 | 92 | 92 | 92 |
| Haze (%) | 0.3 | 0.4 | 0.3 | 0.3 |
| Water vapor permeability (g/m² · 24 h) | 88 | 48 | 85 | 90 |

TABLE 7-continued

| | Examples | | | |
|---|---|---|---|---|
| | 18 | 19 | 20 | 21 |
| Evaluation of polarizing plate | | | | |
| Light leakage | none | none | none | none |

TABLE 8

| | Comparative Examples | | |
|---|---|---|---|
| | 5 | 6 | 7 |
| Resin | PC | PET | TAG |
| Production method | melt extrusion | melt extrusion | solution extrusion |
| Evaluation results of film | | | |
| Thickness (μm) | 75 | 73 | 80 |
| Unevenness of thickness (μm) | ±5.0 | ±4.2 | ±2.1 |
| Unevenness of thickness (%) | ±6.7 | ±5.6 | ±2.6 |
| In-plane retardation Re[550] (nm) | 25.1 | 26.2 | 4.8 |
| Total light transmittance (%) | 90 | 92 | 92 |
| Haze (%) | 0.5 | 1.2 | 0.2 |
| Water vapor permeability (g/m² · 24 h) | 51 | 9 | 516 |
| Evaluation of polarizing plate | | | |
| Light leakage | occurred | occurred | none |

In the following, the lens sheet constituted from the polyester film of the present invention is described in detail.

Examples 22-23

Production and Evaluation of Polyester Film

Using a single-screw extruder (screw diameter: 50 mmφ) provided with a vacuum vent and a 550 mm-wide coat hanger die, the polyester obtained in Production Example 2 was melt-extruded at a cylinder temperature of 220 to 240° C., a die temperature of 240° C. and a discharge rate of 30 kg/h. The extruded molten resin was cooled on a first roll maintained at glass transition temperature −10° C. and a second roll maintained at 60° C., and then taken up at a speed of 12 m/min, thereby producing a polyester film having a thickness of 100 μm and a width of 480 mm. The evaluation results are shown in Table 9.

Production and Evaluation of Prism Sheet

On a brass plate having a size of 3 mm×300 mm×400 mm according to JIS 2804, an optical element pattern (prism pattern) composed of parallel arrays of prisms having an apex angle of 65° and an isosceles triangular cross-section was formed at a pitch of 50 μm by cutting, and then, the brass plate was plated by an electroless nickel plating, to produce a lens mold. After introducing an adequate amount of a mixed solution of acrylic ultraviolet-curable monomers into the lens mold, a polyester film cut into an adequate size was superimposed on the mixed solution while pressing the film using a roll. Next, the mixed solution was irradiated with ultraviolet light from three 6.4 kW ultraviolet lamps (available from Western Quartz products, Inc.) disposed above the polyester film at an intensity of 80 W/cm for 45 s, to cure the resin. Then, the cured product was taken out of the lens mold, thereby obtaining a prism sheet. The evaluation results are shown in Table 9. Meanwhile, the mixed solution of acrylic ultraviolet-curable monomers had the following composition:

50% by weight of "FA-321M" available from Hitachi Chemical Co., Ltd.,

20% by weight of "Kayarad R-604" available from Nippon Kayaku Co., Ltd.,

30% by weight of "Viscote #192" available from Osaka Organic Chemical Industry Ltd., and 1.5% by weight of "Darocure 1173" (radical photopolymerization initiator) available from Merck & Co., Inc.

"FA-321M", "Kayarad R-604" and "Viscote #192" correspond to the radical-polymerizable monomer or oligomer (A), and "Darocure 1173" corresponds to the activated energy radiation-sensitive catalyst (B).

Example 24

Production and Evaluation of Lenticular Lens Sheet

On a brass plate having a size of 3 mm×300 mm×400 mm according to JIS 2804, a lenticular lens portion composed of parallel arrays of cylindrical lenses was formed by cutting recesses having an arcuate cross-section with a radius of curvature of 0.5 mm at a pitch of 0.2 mm, and then, the brass plate was plated by an electroless nickel plating, to produce a lens mold. After introducing an adequate amount of a mixed solution of acrylic ultraviolet-curable monomers into the lens mold, a polyester film cut into an adequate size was superimposed on the mixed solution while pressing the film using a roll. Next, the mixed solution was irradiated with ultraviolet light from three 6.4 kW ultraviolet lamps (available from Western Quartz products, Inc.) disposed above the polyester film at an intensity of 80 W/cm for 45 s, to cure the resin. Then, the cured product was taken out of the lens mold, thereby obtaining a lenticular lens sheet. Meanwhile, the mixed solution of acrylic ultraviolet-curable monomers used above had the same composition as that of the resin solution used for producing the prism sheet.

Example 25

Production and Evaluation of Fresnel Lens Sheet

On a brass plate having a size of 3 mm×300 mm×400 mm according to JIS 2804, a Fresnel lens portion composed of concentric Fresnel lenses having a focal distance of 300 mm and a Fresnel zone pitch of 0.5 mm, and then, the brass plate was plated by an electroless nickel plating, to produce a lens mold. After introducing an adequate amount of a mixed solution of acrylic ultraviolet-curable monomers into the lens mold, a polyester film cut into an adequate size was superimposed on the mixed solution while pressing the film using a roll. Next, the mixed solution was irradiated with ultraviolet light from three 6.4 kW ultraviolet lamps (available from Western Quartz products, Inc.) disposed above the polyester film at an intensity of 80 W/cm for 45 s, to cure the resin. Then, the cured product was taken out of the lens mold, thereby obtaining a Fresnel lens sheet. Meanwhile, the mixed solution of acrylic ultraviolet-curable monomers used above had the same composition as that of the resin solution used for producing the prism sheet.

Example 26

Production and Evaluation of Sheet Having Fresnel Lens Portion/Lenticular Lens Portion A Fresnel lens portion was formed on one surface of the polyester film in the same manner as in the production of the above Fresnel lens sheet, and then a lenticular lens portion was formed on the other surface of the polyester film in the same manner as in the production of the above lenticular lens sheet, thereby producing a sheet having the Fresnel lens portion on one surface and the lenticular lens portion on the other surface.

Example 27

Production and Evaluation of Sheet Having Fresnel Lens Portion/Prism Arrays

A Fresnel lens portion was formed on one surface of the polyester film in the same manner as in the production of the above Fresnel lens sheet, and then, arrays of prisms having an isosceles triangular comprises-section were formed on the other surface of the polyester film in the same manner as in the production of the above prism sheet, thereby producing a sheet having the Fresnel lens portion on one surface and the prism arrays on the other surface.

TABLE 9

|  | Examples | |
| --- | --- | --- |
|  | 22 | 23 |
| Evaluation of polyester film | | |
| Total light transmittance (%) | 92 | 92 |
| Haze (%) | 0.2 | 0.3 |
| In-plane retardation Re[550] (nm) | 2.0 | 1.9 |
| Evaluation of lens sheet | | |
| Rate of change in dimension | | |
| (80° C.; %) | 0.0 | 0.0 |
| (100° C.; %) | 0.0 | 0.0 |
| (120° C.; %) | 0.5 | 0.0 |

In the following, the light diffusion film constituted from the polyester film of the present invention is described in detail.

Example 28

Production of Polyester Film

Using a single-screw extruder (screw diameter: 50 mmφ) provided with a vacuum vent and a 550 mm-wide coat hanger die, the polyester obtained in Production Example 2 was melt-extruded at a cylinder temperature of 220 to 240° C., a die temperature of 240° C. and a discharge rate of 30 kg/h. The extruded molten resin was cooled on a first roll maintained at glass transition temperature −10° C. and a second roll maintained at 60° C., and then taken up at a rate of 12 m/min, thereby producing a polyester film having a thickness of 100 μm and a width of 480 mm. The evaluation results are shown in Table 10.

Production of Light Diffusion Film

After mixing 66% by weight of an ultraviolet-curable resin "DPHA" (refractive index: 1.51) available from Nippon Kayaku Co., Ltd. as a binder resin for forming a light diffusion layer, 4% by weight of a curing initiator "Irgacure 184" available from Ciba Geigy AG, and 30% by weight of acrylic beads "MBX-12" (average particle size: 12 μm, refractive index: 1.49) available from Sekisui Plastics Co., Ltd. as diffusion beads, the mixture was added with a methyl ethyl ketone/methyl isobutyl ketone mixed solvent (3/7 by mass), to regulate the solid content to 24%. The thus prepared composition was applied onto a polyester film and then dried to form a coating layer having a dry thickness of 6.0 µm. Next, using a air-cooling metal halide lamp having an intensity of 160 W/cm available from Eye Graphics Co., Ltd., the coating layer was irradiated with ultraviolet light at an illuminance of 400 mW/cm$^2$ and a cumulative exposure of 300 mJ/cm$^2$ to cure the coating layer, thereby producing a light diffusion film.

TABLE 10

| Resin (Production Example) | 2 |
|---|---|
| Evaluation of film | |
| Thickness (µm) | 80 |
| Rate of change in dimension after storing at 120° C. for 30 min (%) | 0 |
| In-plane retardation Re[550] (nm) | 1.5 |
| Total light transmittance (%) | 92 |
| Haze (%) | 0.4 |

In the following, the anti-reflection film constituted from the polyester film of the present invention is described in detail.

Examples 29-30

Production and Evaluation of Polyester Film

Using a single-screw extruder (screw diameter: 50 mmφ) provided with a vacuum vent and a 550 mm-wide coat hanger die, the polyester obtained in Production Example 2 was melt-extruded at a cylinder temperature of 220 to 240° C., a die temperature of 240° C. and a discharge rate of 30 kg/h. The extruded molten resin was cooled on a first roll maintained at glass transition temperature –10° C. and a second roll maintained at 60° C., and then taken up at a rate of 12 m/min, thereby producing a polyester film having a thickness of 100 µm and a width of 480 mm. The evaluation results are shown in Table 11.

Production and Evaluation of Anti-Reflection Film
Coating of Polyester Film with Hard Coat Layer "DeSolite Z7501" available from JSR Corporation was applied to the above-produced polyester film and irradiated with ultraviolet light for curing to form a hard coat layer having a thickness of 5 µm.

Coating with Anti-Reflection Layer

Next, magnesium fluoride was deposited on the hard coat layer by an electron beam-heating vapor deposition method in a thickness of 100 nm, thereby obtaining an anti-reflection film. The evaluation results are shown in Table 11.

TABLE 11

| | Examples | |
|---|---|---|
| | 29 | 30 |
| Total light transmittance (%) | 92 | 92 |
| Haze (%) | 0.2 | 0.3 |
| In-plane retardation Re[550] (nm) | 1.8 | — |
| Evaluation of anti-reflection film | | |
| Rate of change in dimension | | |
| (80° C.; %) | 0.0 | 0.0 |
| (100° C.; %) | 0.0 | 0.0 |

In the following, the optical information recording medium constituted from the polyester film of the present invention is described in detail.

Example 31

Production of Polyester Film

Using a single-screw extruder (screw diameter: 50 mmφ) provided with a vacuum vent and a 550 mm-wide coat hanger die, the polyester obtained in Production Example 1 was melt-extruded at a cylinder temperature of 220 to 240° C., a die temperature of 240° C. and a discharge rate of 30 kg/h. The extruded molten resin was cooled on a first roll maintained at 96° C. and a second roll maintained at 60° C., and then taken up at a rate of 12 m/min, thereby producing a polyester film having a thickness of 80 µm and a width of 480 mm. The evaluation results are shown in Table 12.

Production of Optical Information Recording Medium (Blu-Ray Disc)

A thin film (reflection layer and recording layer) was formed on a 1.1 mm-thick injection-molded polycarbonate resin circular substrate by a sputtering method. More specifically, a Ag film as the reflection layer, and then a ZiS/SiO$_2$ dielectric film, a Ge/Sb/Te recording film and a ZiS/SiO$_2$ dielectric film as the recording layer were sequentially formed on the substrate. Thereafter, the thus formed films were heat-treated by irradiating a laser to crystallize a whole surface thereof, thereby initializing the recording layer.

Next, using a roll laminator, a highly transparent adhesive was transferred to a polyester film from a highly transparent adhesive transfer tape. The resultant laminate was punched into a concentric doughnut shape having an outer diameter of 119.4 mmφ and an inner diameter of 22.5 mmφ. The polyester film with the transparent adhesive was laminated to the recording layer using a roll laminator, thereby producing an optical information recording medium. During the production, the total thickness of the polyester film and the transparent adhesive layer was adjusted to 100 µm (±2 µm) in which the thickness of the polyester film was 80 µm and the thickness of the transparent adhesive layer was 20 µm. The thus produced optical information recording medium was loaded into a blu-ray disc recorder "BD-HD 100" available from Sharp Corporation to record and reproduce information. As a result of visually observing the reproduced images of the recorded information, it was confirmed that the optical information recording medium exhibited a good recording and reproducing performance.

Example 32

The same procedure as in Example 31 was repeated except that an acrylic adhesive "DP-8005 Clear" available from Sumitomo 3M Limited was applied onto the polyester film from a coater head in place of laminating the highly transparent adhesive transfer tape containing the transparent adhesive on the polyester film using a roll laminator, thereby producing an optical information recording medium.

Example 33

The same procedure as in Example 31 was repeated except that an acryl-modified, one-part, moisture-curable adhesive "Bond Slex Lear" (tradename) available from Konishi Co., Ltd., was applied onto the polyester film from a coater head in place of laminating the high-transparency adhesive transfer tape containing the transparent adhesive on the polyester film using a roll laminator, thereby producing an optical information recording medium.

Example 34

The same procedure as in Example 31 was repeated except that an acetic acid-based, one-part, moisture-curable adhesive "KE-41-T" (tradename) available from Shin-Etsu Chemical Co., Ltd. was applied onto the polyester film from a coater head in place of laminating the high-transparency adhesive transfer tape containing the transparent adhesive on the polyester film using a roll laminator, thereby producing an optical information recording medium.

Example 35

The same procedure as in Example 31 was repeated except that an urethane-based, one-part, moisture-curable adhesive "Takenate M631N" (tradename) available from Mitsui Takeda Chemicals, Inc. was applied onto the polyester film from a coater head in place of laminating the high-transparency adhesive transfer tape containing the transparent adhesive on the polyester film using a roll laminator, thereby producing an optical information recording medium.

Example 36

The same procedure as in Example 31 was repeated except that an acrylic, solvent-free, electron beam-curable adhesive "DA-314" (tradename) available from Nagase ChemteX Corporation was applied onto the polyester film from a coater head in place of laminating the high-transparency adhesive transfer tape containing the transparent adhesive on the polyester film using a roll laminator, thereby producing an optical information recording medium.

Example 37

The same procedure as in Example 31 was repeated except that an epoxy-based, solvent-free, ultraviolet-curable adhesive "Norland Optical Adhesive 81" (tradename) available from Norland Products, Inc. was applied onto the polyester film from a coater head in place of laminating the high-transparency adhesive transfer tape containing the transparent adhesive on the polyester film using a roll laminator, thereby producing an optical information recording medium.

Example 38

The same procedure as in Example 31 was repeated except that an acrylic adhesive "KONY BOND" (tradename) available from Konishi Co., Ltd., was applied onto the polyester film from a coater head in place of laminating the high-transparency adhesive transfer tape containing the transparent adhesive on the polyester film using a roll laminator, thereby producing an optical information recording medium.

Comparative Example 8

Figure 7:
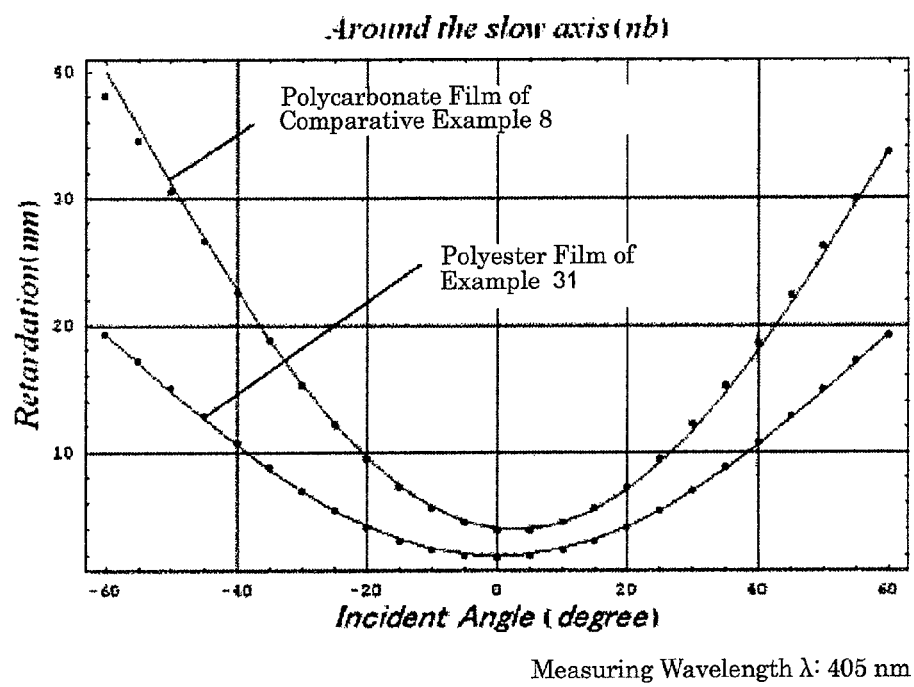
FIG. 7 is a graph showing an incident angle dependency of the retardation.

The retardation of a film which was obtained by removing a transparent adhesive layer from a protective layer of a blu-ray disc for picture recording "BF23 GB" available from Sony Corporation was evaluated. The results are shown in FIG. 7. As a result of measuring an absorption spectrum of the film by ATRFT-IR method, it was confirmed that the film was made of a PC resin.

The optically isotropic polyester film of the present invention is excellent in optical transparency and exhibits a low retardation which is attributable to birefringence. In particular, the in-plane retardation Re[405] of blu-ray discs with respect to a vertical incidence at a wavelength of 405 nm is preferably 5 nm or less. As shown in FIG. 7, it was confirmed that the in-plane retardation Re[405] in Comparative Example 8 was as high as 3.97 nm, whereas the in-plane retardation Re[405] in Example 31 was as low as 1.97 nm.

The retardation in Example 31 at a wavelength of 405 nm in the range of a maximum incident angle of ±60° (calculated from a numerical aperture of 0.85 of the pick-up optical system) was 20 nm or less, which was lower than 40 nm or less in Comparative Example 8. As described above, since the change in plane of polarization of an incident laser which is attributable to the birefringence of polyester film is minimized, the polyester film of the present invention is suitably used as a material for a protective layer of blu-ray discs.

TABLE 12

|  | Example 31 | Comparative Example 8 |
|---|---|---|
| Resin (Production Example) | 1 | PC |
| Evaluation results of film |  |  |
| Thickness (μm) | 80 | 80 |
| In-plane retardation Re[405] (nm) | 1.94 | 3.97 |
| Retardation at ±60° inclined incidence | 20 or less | 40 or less |
| Total light transmittance (%) | 92 | — |
| Haze (%) | 0.4 | — |

INDUSTRIAL APPLICABILITY

The polyester film of the present invention is easily made into an optically isotropic film by a cost-effective extrusion-molding method. Further, the polyester film of the present invention is suitably applied to optical members such as a polarizing plate or a phase difference film. Therefore, the present invention has a great industrial value.

What is claimed is:

1. A polyester film produced by melt-extruding a polyester which comprises a dicarboxylic acid unit and a diol unit, wherein 1 to 80 mol % of the diol unit is a diol unit containing a cyclic acetal skeleton, and the polyester film has an in-plane retardation of 20 nm or less at a wavelength of 550 nm.

2. The polyester film according to claim 1, wherein the diol unit containing a cyclic acetal skeleton is derived from a diol represented by the following general formula (1):

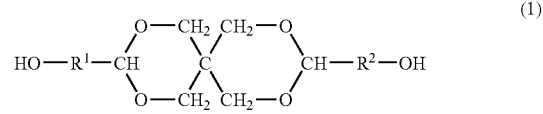

wherein $R^1$ and $R^2$ may be the same or different, and are each independently a hydrocarbon group selected from the group consisting of an aliphatic hydrocarbon group having 1 to 10 carbon atoms, an alicyclic hydrocarbon group having 3 to 10 carbon atoms and an aromatic hydrocarbon group having 6 to 10 carbon atoms, or derived from a diol represented by the following general formula (2):

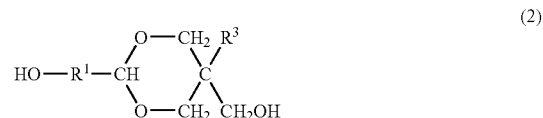

wherein $R^1$ is the same as defined above and $R^3$ is a hydrocarbon group selected from the group consisting of an aliphatic hydrocarbon group having 1 to 10 carbon atoms, an alicyclic hydrocarbon group having 3 to 10 carbon atoms and an aromatic hydrocarbon group having 6 to 10 carbon atoms.

3. The polyester film according to claim 2, wherein the diol unit containing a cyclic acetal skeleton is derived from 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane.

4. The polyester film according to claim 1, wherein the diol unit other than the diol unit containing a cyclic acetal skeleton is derived from at least one diol selected from the group consisting of ethylene glycol, diethylene glycol, trimethylene glycol, 1,4-butanediol and 1,4-cyclohexane dimethanol.

5. The polyester film according to claim 1, wherein the dicarboxylic acid unit is derived from at least one dicarboxylic acid selected from the group consisting of terephthalic acid, isophthalic acid and 2,6-naphthalenedicarboxylic acid.

6. A process for producing the polyester film as defined in claim 1, comprising the steps of:
melt-extruding the polyester into a molten film, and
cooling and solidifying the molten film by contacting the molten film with a cooling roll to form a film having a thickness of 1 to 500 μm,
wherein the polyester is melt-extruded at a temperature of from 200 to 300° C. by under conditions of an air gap of 100 mm or less and a take-up speed of from 0.2 to 100 m/min, and a temperature of the cooling roll is regulated within a range of from a glass transition temperature of the polyester −30° C. to the glass transition temperature +30° C.

7. An optical member comprising a film layer constituted from a stretched film of the polyester film as defined in claim 1.

8. The optical member according to claim 7, which is a phase difference film having a film layer constituted from the stretched film having a controlled in-plane retardation and/or a coefficient Nz.

9. The optical member according to claim 8, which has a multilayer structure comprising two or more film layers.

10. The optical member according to claim 8, wherein an optically isotropic protective film is laminated on at least one surface of the film layer.

11. An optical member which is a phase difference film having a film layer constituted from a stretched film having a controlled in-plane retardation and/or a coefficient Nz, wherein an optically isotropic protective film is laminated on at least one surface of the film layer, and, wherein the optically isotropic protective film has a film layer comprising the polyester film as defined in claim 1.

12. The optical member according to claim 8, wherein a polarizing plate is integrally laminated on the film layer.

13. The optical member according to claim 8, wherein a release sheet is laminated on at least one surface of the film layer through a self adhesive layer or a bond layer.

14. The optical member according to claim 7, which is a polarizing plate comprising a film layer constituted from the polyester film and a polarizing film, the film layer having a water vapor permeability of from 10 to 300 g/(m²·24 h) at 40° C. and 90% RH.

15. The optical member according to claim 14, wherein the polyester film has an in-plane retardation of 5 nm or less at a wavelength of 550 nm.

16. The optical member according to claim 14, wherein the polyester film has a thickness of 200 μm or less, and a difference between a maximum thickness and a minimum thickness of the polyester film is 2% or less of an average thickness thereof.

17. The optical member according to claim 14, wherein the polyester film has a total light transmittance of 90% or more and a haze of 1% or less.

18. The optical member according to claim 7, which is a light diffusion film comprising a film layer constituted from the polyester film and a light diffusion layer constituted from diffusion beads and a binder resin.

19. The optical member according to claim 18, wherein the binder resin is at least one resin selected from the group consisting of an ionizing radiation-curable resin, a thermosetting resin, an electron beam-curable resin and an ultraviolet-curable resin.

20. The optical member according to claim 18, wherein the diffusion beads are made of at least one material selected from the group consisting of glass, an acrylic resin, an urethane resin, a vinyl chloride resin and a polycarbonate resin.

21. The optical member according to claim 7, which is a lens sheet comprising a film layer constituted from the polyester film and an optical element formed on at least one surface of the film layer.

22. The optical member according to claim 21, wherein the optical element is formed from an activated energy radiation-curable resin.

23. The optical member according to claim 21, wherein the optical element comprises a prism portion constituted from arrays of prisms, each prism having a triangular cross-sectional and being arranged in parallel rows.

24. The optical member according to claim 21, wherein the optical element comprises a lenticular lens portion constituted from arrays of cylindrical lenses which are arranged in parallel.

25. The optical member according to claim 21, wherein the optical element comprises a Fresnel lens portion in a form of concentric Fresnel lenses.

26. The optical member according to claim 7, which is an anti-reflection film comprising a film layer constituted from the polyester film and an anti-reflection layer laminated on the film layer.

27. The optical member according to claim 7, which is an optical information recording medium comprising a film layer constituted from the polyester film, a transparent adhesive layer, a recording layer, a reflection layer and a substrate which are sequentially laminated in this order.

28. The optical member according to claim 27, wherein a total thickness of the film layer and the transparent adhesive layer is from 98 to 102 μm.

29. The optical member according to claim 27, wherein the film layer has an in-plane retardation of 5 nm or less at a wavelength of 405 nm.

* * * * *